United States Patent
Pravinchandra Bhatt et al.

(10) Patent No.: US 12,149,961 B2
(45) Date of Patent: Nov. 19, 2024

(54) APPARATUS, METHODS, AND COMPUTER PROGRAMS FOR AUTOMATIC NEIGHBOR RELATIONS

(71) Applicant: NOKIA TECHNOLOGIES OY, Espoo (FI)

(72) Inventors: Rakshesh Pravinchandra Bhatt, Bangalore (IN); Sivaramakrishnan Swaminathan, Bangalore (IN); Anatoly Andrianov, Schaumburg, IL (US); Konstantinos Samdanis, Munich (DE); Olaf Pollakowski, Berlin (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 358 days.

(21) Appl. No.: 17/729,579

(22) Filed: Apr. 26, 2022

(65) Prior Publication Data
US 2022/0353703 A1 Nov. 3, 2022

(30) Foreign Application Priority Data

Apr. 29, 2021 (IN) .............................. 202141019711
Aug. 4, 2021 (IN) .............................. 202141035156

(51) Int. Cl.
*H04W 24/02* (2009.01)
*H04W 16/28* (2009.01)
(Continued)

(52) U.S. Cl.
CPC ........... *H04W 24/02* (2013.01); *H04W 16/28* (2013.01); *H04W 24/08* (2013.01); *H04W 64/003* (2013.01); *H04W 36/00835* (2018.08)

(58) Field of Classification Search
CPC ..... H04W 24/02; H04W 16/28; H04W 24/08; H04W 64/003; H04W 16/18;
(Continued)

(56) References Cited

U.S. PATENT DOCUMENTS 10,440,639 B1 10/2019 Vivanco et al.
11,632,284 B2 * 4/2023 Lincoln ............... H04L 41/0816
370/328
(Continued)

FOREIGN PATENT DOCUMENTS

CA 2720130 A1 10/2009
CN 102695188 A 9/2012
(Continued)

OTHER PUBLICATIONS

3rd Generation Partnership Project; Technical Specification Group Services and System Aspects; Telecommunication management; Study on the Self-Organizing Networks (SON) for 5G networks (Release 16); 3GPP TR 28.861, V16.0.0, Dec. 2019.
(Continued)

*Primary Examiner* — Brian T O Connor
(74) *Attorney, Agent, or Firm* — SQUIRE PATTON BOGGS (US) LLP

(57) ABSTRACT

There is provided an apparatus configured to: receive, from a management service, location data associated with each of a plurality of transmitters; receive beam and/or antenna parameters associated with beams provided by the plurality of transmitters; use the received location data and received parameters to generate image data representing transmission ranges of the plurality of transmitters; and provide the generated image data to the management service.

20 Claims, 29 Drawing Sheets

(51) Int. Cl.
*H04W 24/08* (2009.01)
*H04W 36/00* (2009.01)
*H04W 64/00* (2009.01)

(58) Field of Classification Search
CPC ........... H04W 36/00835; H04W 24/10; H04W 48/16; H04W 36/0061
See application file for complete search history.

(56) References Cited

U.S. PATENT DOCUMENTS

| | | | | |
|---|---|---|---|---|
| 11,800,584 | B2* | 10/2023 | Raval | H04W 36/14 |
| 11,871,439 | B2* | 1/2024 | Rao | H04L 5/0073 |
| 11,903,095 | B2* | 2/2024 | Mishra | H04W 92/20 |
| 11,950,151 | B2* | 4/2024 | Chou | H04W 28/0268 |
| 2011/0028181 | A1 | 2/2011 | Byun et al. | |
| 2014/0018080 | A1 | 1/2014 | Bazar et al. | |
| 2016/0286414 | A1 | 9/2016 | Zhou et al. | |
| 2018/0160323 | A1 | 6/2018 | Zhou et al. | |
| 2019/0357100 | A1 | 11/2019 | Ramachandra et al. | |
| 2019/0364443 | A1 | 11/2019 | Hwang et al. | |
| 2021/0409994 | A1* | 12/2021 | Frydman | H04W 24/08 |
| 2022/0338043 | A1* | 10/2022 | Kazmi | H04W 24/10 |
| 2023/0006731 | A1 | 1/2023 | Diaz Sendra | H04W 76/10 |
| 2024/0022950 | A1* | 1/2024 | Bouton | H04W 28/20 |
| 2024/0163746 | A1* | 5/2024 | Belleschi | H04W 36/18 |

FOREIGN PATENT DOCUMENTS

| | | | |
|---|---|---|---|
| CN | 103493531 | A | 1/2014 |
| CN | 103906106 | A | 7/2014 |
| CN | 104254090 | A | 12/2014 |
| CN | 105992168 | A | 10/2016 |
| CN | 108235335 | A | 6/2018 |
| CN | 108271165 | A | 7/2018 |
| CN | 109219973 | A | 1/2019 |
| CN | 110493813 | A | 11/2019 |
| CN | 110636520 | A | 12/2019 |
| CN | 111295904 | A | 6/2020 |
| CN | 111885662 | A | 11/2020 |
| EP | 2260657 | B1 | 5/2012 |
| EP | 2283676 | B1 | 3/2016 |
| JP | 2014176087 | A | 9/2014 |
| KR | 1020190089319 | A | 7/2019 |
| NO | 2012024956 | A1 | 1/2012 |
| WO | 2019241939 | A1 | 12/2019 |
| WO | 2020146216 | A1 | 7/2020 |
| WO | 2020146277 | A1 | 7/2020 |
| WO | 2020198571 | A2 | 10/2020 |
| WO | 2020247644 | A1 | 12/2020 |

OTHER PUBLICATIONS

3rd Generation Partnership Project; Technical Specification Group Services and System Aspects; Management and orchestration; Self-Organizing Networks (SON) for 5G networks (Release 17); 3GPP TS 28.313, V17.0.0, Dec. 2020.

3rd Generation Partnership Project; Technical Specification Group Services and System Aspects; Management and orchestration; Management capabilities (Release 16); 3GPP TS 28.537, V16.0.0, Mar. 2020.

3rd Generation Partnership Project; Technical Specification Group Services and System Aspects; Telecommunication management; Generic Network Resource Model (NRM) Integration Reference Point (IRP); Information Service (IS) (Release 16); 3GPP TS 28.622, V16.6.0, Dec. 2020.

3rd Generation Partnership Project; Technical Specification Group Services and System Aspects; Telecommunication management; Automatic Neighbour Relation (ANR) management; Concepts and requirements (Release 16); 3GPP TS 32.511, V16.0.0, Dec. 2019.

* cited by examiner

Fig. 9A
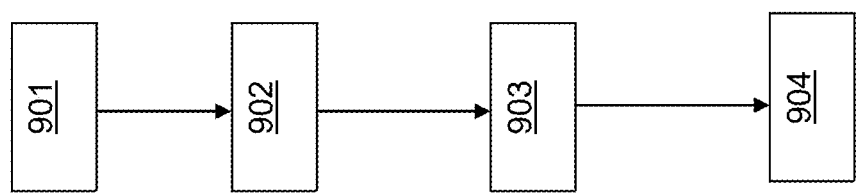
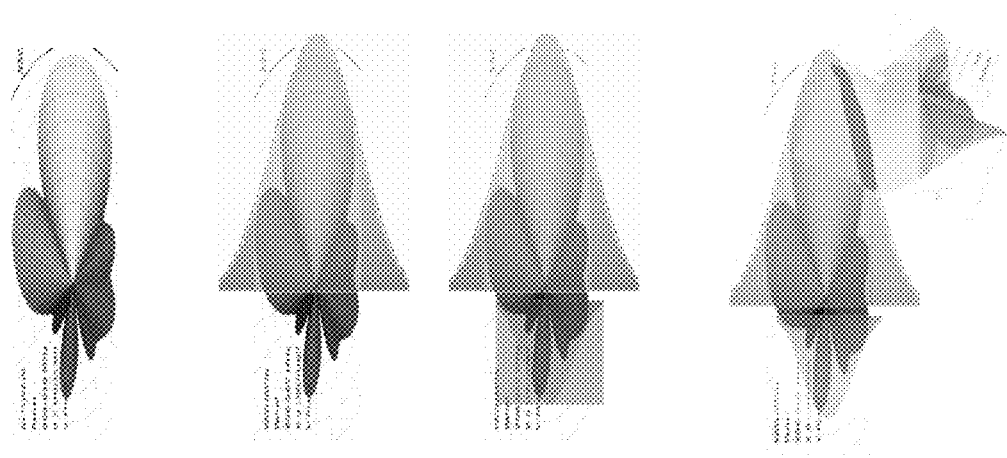

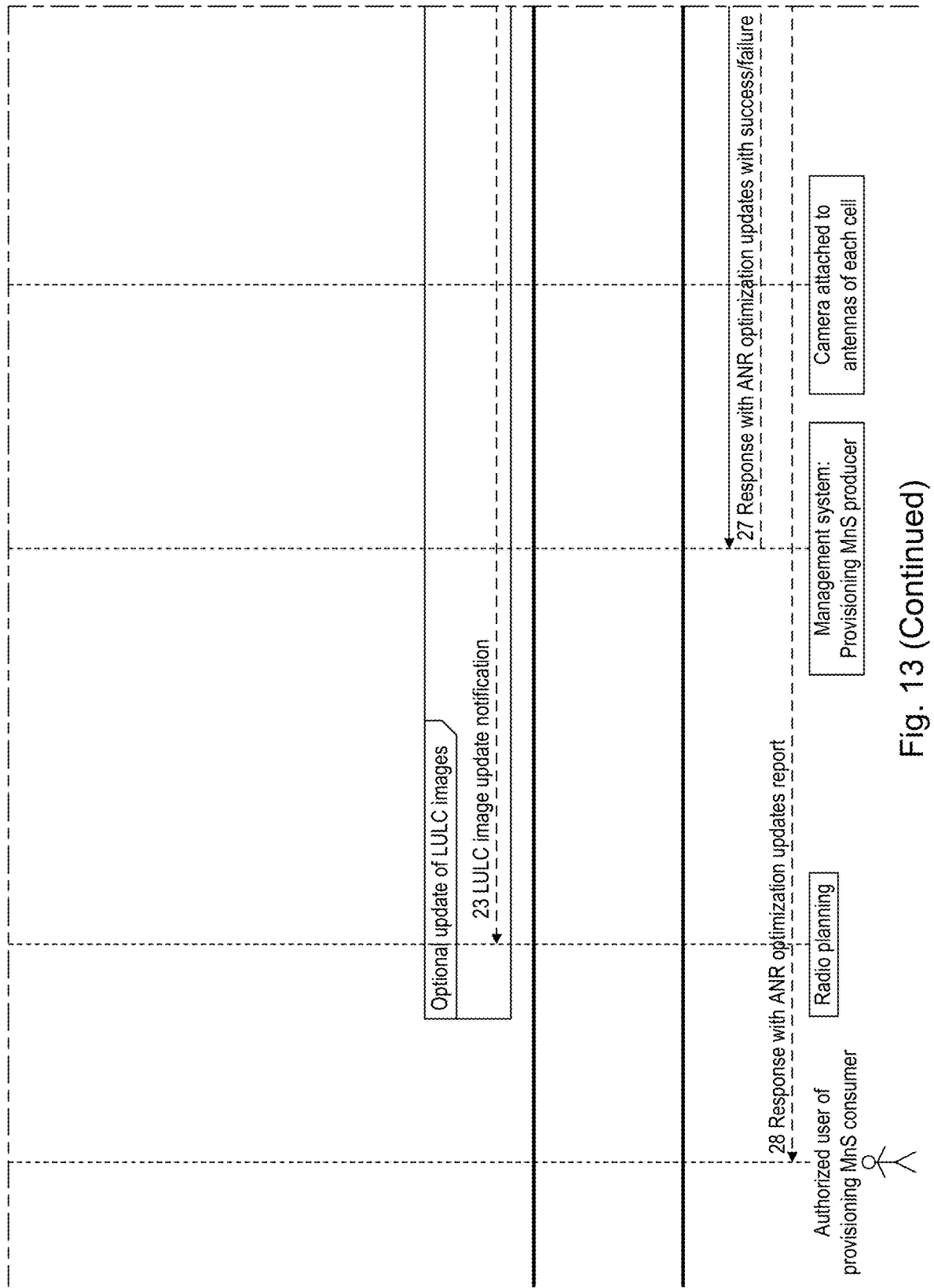

APPARATUS, METHODS, AND COMPUTER PROGRAMS FOR AUTOMATIC NEIGHBOR RELATIONS

CROSS-REFERENCE TO RELATED APPLICATIONS

This application claims priority from Indian application no. 202141019711 filed on Apr. 29, 2021 and Indian application no. 202141035156 filed on Aug. 4, 2021. The entire contents of these earlier filed applications are hereby incorporated by reference in their entirety.

FIELD

The present disclosure relates to apparatus, methods, and computer programs, and in particular but not exclusively to apparatus, methods and computer programs for network apparatuses. For example, certain embodiments may generally relate to automatic neighbor relations (ANR).

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for an analytics producer, the apparatus comprising: at least one processor; and at least one memory comprising computer code that, when executed by the at least one processor, causes the analytics producer to: receive, from a management service, location data associated with each of a plurality of transmitters; receive beam and/or antenna parameters associated with beams provided by the plurality of transmitters; use the received location data and received parameters to generate image data representing transmission ranges of the plurality of transmitters; and provide the generated image data to the management service.

The analytics producer may be caused to: receive the beam and/or antenna parameters from the management service.

The beam parameters may comprise at least one of: beam width; beam power; beam direction; antenna type; and antenna azimuth.

The antenna parameters may comprise image data representing at least one transmission pattern provided by at least one transmitter of the plurality of transmitters.

The analytics producer may be caused to: receive, from the management service, an indication that the apparatus should apply a Gaussian function when generating the image data.

The analytics producer may be caused to: generate the image data by, for each of the plurality of transmitters, applying a respective Gaussian function to image data representing the location of said each of the plurality of transmitters.

The Gaussian function respectively applied to a particular transmitter's location-based image data may be generated utilising a beam power of the particular transmitter as a peak amplitude, a beam width of the particular transmitter as a standard deviation, and a beam direction as a direction for applying the respective Gaussian function.

The Gaussian function may be a three dimensional Gaussian function.

The analytics producer may be caused to: generate the image data by, for each of the plurality of transmitters, applying a respective antenna transmission pattern to image data representing the location of said each of the plurality of transmitters.

According to a second aspect, there is provided an apparatus for a management service, the apparatus comprising: at least one processor; and at least one memory comprising computer code that, when executed by the at least one processor, causes the management service to: send, to an analytics producer, location data associated with each of a plurality of transmitters; receive, from the analytics producer, image data representing transmission ranges of the plurality of transmitters; use image analytics techniques on the received image data to determine neighbouring transmitters of the plurality of transmitters; and use the determined neighbouring transmitters for configuring radio network transmissions.

The management service may be caused to: obtain beam and/or antenna parameters associated with beams provided by the plurality of transmitters; and send, to the analytics producer, the obtained beam and/or antenna parameters.

The beam parameters may comprise at least one of: beam width; beam power; beam direction; antenna type; and antenna azimuth.

The management service may be caused to: send, to a radio planning entity, a request for the beam and/or antenna parameters.

The antenna parameters may comprise image data representing at least one transmission pattern provided by at least one transmitter of the plurality of transmitters.

The management service may be caused to: send, to the analytics producer, an indication that the analytics producer should apply a Gaussian mask when generating the image data.

Said use image analytics techniques on the received image data to determine neighbouring transmitters of the plurality of transmitters may comprise determining areas of overlap of transmission areas of said plurality of transmitters utilizing at least one colour of the image data.

Said received image data may correspond to multiple planes of view.

The management service may be caused to determine that transmitters of the plurality of transmitters are neighbouring transmitters when their respective transmission regions overlap in at least two planes of view.

According to a third aspect, there is provided an apparatus for an analytics producer, the apparatus comprising: means for receiving, from a management service, location data associated with each of a plurality of transmitters; means for receiving beam and/or antenna parameters associated with beams provided by the plurality of transmitters; means for using the received location data and received parameters to generate image data representing transmission ranges of the plurality of transmitters; and means for providing the generated image data to the management service.

The analytics producer may comprise means for receiving the beam and/or antenna parameters from the management service.

The beam parameters may comprise at least one of: beam width; beam power; beam direction; antenna type; and antenna azimuth.

The antenna parameters may comprise image data representing at least one transmission pattern provided by at least one transmitter of the plurality of transmitters.

The analytics producer may comprise means for receiving, from the management service, an indication that the apparatus should apply a Gaussian function when generating the image data.

The analytics producer may comprise means for generating the image data by, for each of the plurality of transmitters, applying a respective Gaussian function to image data representing the location of said each of the plurality of transmitters.

The Gaussian function respectively applied to a particular transmitter's location-based image data may be generated utilising a beam power of the particular transmitter as a peak amplitude, a beam width of the particular transmitter as a standard deviation, and a beam direction as a direction for applying the respective Gaussian function.

The Gaussian function may be a three dimensional Gaussian function.

The analytics producer may comprise means for generating the image data by, for each of the plurality of transmitters, applying a respective antenna transmission pattern to image data representing the location of said each of the plurality of transmitters.

According to a fourth aspect, there is provided an apparatus for a management service, the apparatus comprising: means for sending, to an analytics producer, location data associated with each of a plurality of transmitters; means for receiving, from the analytics producer, image data representing transmission ranges of the plurality of transmitters; means for using image analytics techniques on the received image data to determine neighbouring transmitters of the plurality of transmitters; and means for using the determined neighbouring transmitters for configuring radio network transmissions.

The management service may comprise means for obtaining beam and/or antenna parameters associated with beams provided by the plurality of transmitters; and means for sending, to the analytics producer, the obtained beam and/or antenna parameters.

The beam parameters may comprise at least one of: beam width; beam power; beam direction; antenna type; and antenna azimuth.

The management service may comprise means for sending, to a radio planning entity, a request for the beam and/or antenna parameters.

The antenna parameters may comprise image data representing at least one transmission pattern provided by at least one transmitter of the plurality of transmitters.

The management service may comprise means for sending, to the analytics producer, an indication that the analytics producer should apply a Gaussian mask when generating the image data.

Said means for using image analytics techniques on the received image data to determine neighbouring transmitters of the plurality of transmitters may comprise means for determining areas of overlap of transmission areas of said plurality of transmitters utilizing at least one colour of the image data.

Said received image data may correspond to multiple planes of view.

The management service may comprise means for determining that transmitters of the plurality of transmitters are neighbouring transmitters when their respective transmission regions overlap in at least two planes of view.

According to a fifth aspect, there is provided a method for an apparatus for an analytics producer, the method comprising: receiving, from a management service, location data associated with each of a plurality of transmitters; receiving beam and/or antenna parameters associated with beams provided by the plurality of transmitters; using the received location data and received parameters to generate image data representing transmission ranges of the plurality of transmitters; and providing the generated image data to the management service.

The method may comprise receiving the beam and/or antenna parameters from the management service.

The beam parameters may comprise at least one of: beam width; beam power; beam direction; antenna type; and antenna azimuth.

The antenna parameters may comprise image data representing at least one transmission pattern provided by at least one transmitter of the plurality of transmitters.

The method may comprise receiving, from the management service, an indication that the apparatus should apply a Gaussian function when generating the image data.

The method may comprise generating the image data by, for each of the plurality of transmitters, applying a respective Gaussian function to image data representing the location of said each of the plurality of transmitters.

The Gaussian function respectively applied to a particular transmitter's location-based image data may be generated utilising a beam power of the particular transmitter as a peak amplitude, a beam width of the particular transmitter as a standard deviation, and a beam direction as a direction for applying the respective Gaussian function.

The Gaussian function may be a three dimensional Gaussian function.

The method may comprise generating the image data by, for each of the plurality of transmitters, applying a respective antenna transmission pattern to image data representing the location of said each of the plurality of transmitters.

According to a sixth aspect, there is provided a method for an apparatus for a management service, the method comprising: sending, to an analytics producer, location data associated with each of a plurality of transmitters; receiving, from the analytics producer, image data representing transmission ranges of the plurality of transmitters; using image analytics techniques on the received image data to determine neighbouring transmitters of the plurality of transmitters; and using the determined neighbouring transmitters for configuring radio network transmissions.

The method may comprise obtaining beam and/or antenna parameters associated with beams provided by the plurality of transmitters; and sending, to the analytics producer, the obtained beam and/or antenna parameters.

The beam parameters may comprise at least one of: beam width; beam power; beam direction; antenna type; and antenna azimuth.

The method may comprise sending, to a radio planning entity, a request for the beam and/or antenna parameters.

The antenna parameters may comprise image data representing at least one transmission pattern provided by at least one transmitter of the plurality of transmitters.

The method may comprise sending, to the analytics producer, an indication that the analytics producer should apply a Gaussian mask when generating the image data.

Said using image analytics techniques on the received image data to determine neighbouring transmitters of the plurality of transmitters may comprise determining areas of overlap of transmission areas of said plurality of transmitters utilizing at least one colour of the image data.

Said received image data may correspond to multiple planes of view.

The method may comprise determining that transmitters of the plurality of transmitters are neighbouring transmitters when their respective transmission regions overlap in at least two planes of view.

According to a seventh aspect, there is provided an apparatus for an analytics producer, the apparatus comprising: receiving circuitry for receiving, from a management service, location data associated with each of a plurality of transmitters; receiving circuitry for receiving beam and/or antenna parameters associated with beams provided by the plurality of transmitters; using circuitry for using the received location data and received parameters to generate image data representing transmission ranges of the plurality of transmitters; and providing circuitry for providing the generated image data to the management service.

The analytics producer may comprise receiving circuitry for receiving the beam and/or antenna parameters from the management service.

The beam parameters may comprise at least one of: beam width; beam power; beam direction; antenna type; and antenna azimuth.

The antenna parameters may comprise image data representing at least one transmission pattern provided by at least one transmitter of the plurality of transmitters.

The analytics producer may comprise receiving circuitry for receiving, from the management service, an indication that the apparatus should apply a Gaussian function when generating the image data.

The analytics producer may comprise generating circuitry for generating the image data by, for each of the plurality of transmitters, applying a respective Gaussian function to image data representing the location of said each of the plurality of transmitters.

The Gaussian function respectively applied to a particular transmitter's location-based image data may be generated utilising a beam power of the particular transmitter as a peak amplitude, a beam width of the particular transmitter as a standard deviation, and a beam direction as a direction for applying the respective Gaussian function.

The Gaussian function may be a three dimensional Gaussian function.

The analytics producer may comprise generating circuitry for generating the image data by, for each of the plurality of transmitters, applying a respective antenna transmission pattern to image data representing the location of said each of the plurality of transmitters.

According to an eighth aspect, there is provided an apparatus for a management service, the apparatus comprising: sending circuitry for sending, to an analytics producer, location data associated with each of a plurality of transmitters; receiving circuitry for receiving, from the analytics producer, image data representing transmission ranges of the plurality of transmitters; using circuitry for using image analytics techniques on the received image data to determine neighbouring transmitters of the plurality of transmitters; and using circuitry for using the determined neighbouring transmitters for configuring radio network transmissions.

The management service may comprise obtaining circuitry for obtaining beam and/or antenna parameters associated with beams provided by the plurality of transmitters; and sending circuitry for sending, to the analytics producer, the obtained beam and/or antenna parameters.

The beam parameters may comprise at least one of: beam width; beam power; beam direction; antenna type; and antenna azimuth.

The management service may comprise sending circuitry for sending, to a radio planning entity, a request for the beam and/or antenna parameters.

The antenna parameters may comprise image data representing at least one transmission pattern provided by at least one transmitter of the plurality of transmitters.

The management service may comprise sending circuitry for sending, to the analytics producer, an indication that the analytics producer should apply a Gaussian mask when generating the image data.

Said using circuitry for using image analytics techniques on the received image data to determine neighbouring transmitters of the plurality of transmitters may comprise determining circuitry for determining areas of overlap of transmission areas of said plurality of transmitters utilizing at least one colour of the image data.

Said received image data may correspond to multiple planes of view.

The management service may comprise determining circuitry for determining that transmitters of the plurality of transmitters are neighbouring transmitters when their respective transmission regions overlap in at least two planes of view.

According to a ninth aspect, there is provided non-transitory computer readable medium comprising program instructions for causing an apparatus for an analytics producer to perform at least the following: receive, from a management service, location data associated with each of a plurality of transmitters; receive beam and/or antenna parameters associated with beams provided by the plurality of transmitters; use the received location data and received parameters to generate image data representing transmission ranges of the plurality of transmitters; and provide the generated image data to the management service.

The analytics producer may be caused to: receive the beam and/or antenna parameters from the management service.

The beam parameters may comprise at least one of: beam width; beam power; beam direction; antenna type; and antenna azimuth.

The antenna parameters may comprise image data representing at least one transmission pattern provided by at least one transmitter of the plurality of transmitters.

The analytics producer may be caused to: receive, from the management service, an indication that the apparatus should apply a Gaussian function when generating the image data.

The analytics producer may be caused to: generate the image data by, for each of the plurality of transmitters, applying a respective Gaussian function to image data representing the location of said each of the plurality of transmitters.

The Gaussian function respectively applied to a particular transmitter's location-based image data may be generated utilising a beam power of the particular transmitter as a peak amplitude, a beam width of the particular transmitter as a standard deviation, and a beam direction as a direction for applying the respective Gaussian function.

The Gaussian function may be a three dimensional Gaussian function.

The analytics producer may be caused to: generate the image data by, for each of the plurality of transmitters, applying a respective antenna transmission pattern to image data representing the location of said each of the plurality of transmitters.

According to a tenth aspect, there is provided non-transitory computer readable medium comprising program instructions for causing an apparatus for a management service to perform at least the following: send, to an analytics producer, location data associated with each of a plurality of transmitters; receive, from the analytics producer, image data representing transmission ranges of the plurality of transmitters; use image analytics techniques on the received image data to determine neighbouring transmitters of the plurality of transmitters; and use the determined neighbouring transmitters for configuring radio network transmissions.

The management service may be caused to: obtain beam and/or antenna parameters associated with beams provided by the plurality of transmitters; and send, to the analytics producer, the obtained beam and/or antenna parameters.

The beam parameters may comprise at least one of: beam width; beam power; beam direction; antenna type; and antenna azimuth.

The management service may be caused to: send, to a radio planning entity, a request for the beam and/or antenna parameters.

The antenna parameters may comprise image data representing at least one transmission pattern provided by at least one transmitter of the plurality of transmitters.

The management service may be caused to: send, to the analytics producer, an indication that the analytics producer should apply a Gaussian mask when generating the image data.

Said use image analytics techniques on the received image data to determine neighbouring transmitters of the plurality of transmitters may comprise determining areas of overlap of transmission areas of said plurality of transmitters utilizing at least one colour of the image data.

Said received image data may correspond to multiple planes of view.

The management service may be caused to determine that transmitters of the plurality of transmitters are neighbouring transmitters when their respective transmission regions overlap in at least two planes of view.

According to an eleventh aspect, there is provided a computer program comprising program instructions for causing a computer to perform any method as described above.

According to a twelfth aspect, there is provided a computer program product stored on a medium that may cause an apparatus to perform any method as described herein.

According to a thirteenth aspect, there is provided an electronic device that may comprise apparatus as described herein.

According to a fourteenth aspect, there is provided a chipset that may comprise an apparatus as described herein.

According to another aspect there is provided an apparatus comprising means for performing sending information relating to conditions within a plurality of cells to a network entity, the information relating to conditions within the plurality of cells comprising at least camera image information; and in response to the sending information, receiving first information from the network entity, the first information comprising information of measured radio conditions within the plurality of cells; receiving second information from the network entity; the second information comprising information of predicted radio conditions within the plurality of cells; comparing the first information and the second information to determine areas of correspondence between the first information and the second information; and based at least in part on the comparing, determining neighbour cell relations within the plurality of cells.

According to some examples, the means are further configured to perform obtaining a minimization of drive test image of the plurality of cells, and the sending information relating to conditions within the plurality of cells to the network entity comprises sending the minimization of drive test image to the network entity.

According to some examples, the minimization of drive test image is in a vertical geographical plane.

According to some examples, the means are further configured to perform obtaining a land-use land-cover image of the plurality of cells, and the sending information relating to conditions within the plurality of cells to the network entity comprises sending the land-use land-cover image to the network entity.

According to some examples, the land-use land-cover image is in a horizontal geographical plane.

According to some examples, the means are further configured to perform obtaining information of one or more antenna beam patterns within the plurality of cells, and the sending information relating to conditions within the plurality of cells to the network entity comprises sending the one or more antenna beam patterns to the network entity.

According to some examples, the camera image information comprises object recognition information.

According to some examples, the means are further configured to perform, when comparing the first information and the second information, giving a higher weighting to the first information.

According to some examples, the first information is in the form of a first image that has been generated by the network entity and the second information is in the form of a second image that has been prepared by the network entity, and the comparing comprises comparing one or more tiles in the first image with one or more tiles in the second image.

According to some examples, the means are further configured to perform sending information of the determined neighbour cell relations to one or more of: a network management system; an operator.

According to some examples, the apparatus comprises a C-SON apparatus and the network entity comprises an MDAS entity.

According to some examples, the means comprises at least one processor; and at least one memory including computer program code, the at least one memory and computer program code configured to, with the at least one processor, cause the performance of the apparatus.

According to another aspect there is provided an apparatus comprising at least one processor; and at least one memory including computer program code; the at least one memory and the computer program code configured to, with the at least one processor, cause the apparatus at least to perform: sending information relating to conditions within a plurality of cells to a network entity, the information relating to conditions within the plurality of cells comprising at least camera image information; and in response to the sending information, receiving first information from the network entity, the first information comprising information of measured radio conditions within the plurality of cells; receiving second information from the network entity; the second information comprising information of predicted radio conditions within the plurality of cells; comparing the first information and the second information to determine areas of correspondence between the first information and the second information; and based at least in part on the comparing, determining neighbour cell relations within the plurality of cells.

According to another aspect there is provided an apparatus comprising: circuitry for sending information relating to conditions within a plurality of cells to a network entity, the information relating to conditions within the plurality of cells comprising at least camera image information; and circuitry for, in response to the sending information, receiving first information from the network entity, the first information comprising information of measured radio conditions within the plurality of cells; circuitry for receiving second information from the network entity; the second information comprising information of predicted radio conditions within the plurality of cells; circuitry for comparing the first information and the second information to determine areas of correspondence between the first information and the second information; and circuitry for, based at least in part on the comparing, determining neighbour cell relations within the plurality of cells.

According to another aspect there is provided a method comprising: sending information relating to conditions within a plurality of cells to a network entity, the information relating to conditions within the plurality of cells comprising at least camera image information; and in response to the sending information; receiving first information from the network entity, the first information comprising information of measured radio conditions within the plurality of cells; receiving second information from the network entity; the second information comprising information of predicted radio conditions within the plurality of cells; comparing the first information and the second information to determine areas of correspondence between the first information and the second information; and based at least in part on the comparing, determining neighbour cell relations within the plurality of cells.

According to some examples the method comprises obtaining a minimization of drive test image of the plurality of cells, and the sending information relating to conditions within the plurality of cells to the network entity comprises sending the minimization of drive test image to the network entity.

According to some examples the minimization of drive test image is in a vertical geographical plane.

According to some examples the method comprises obtaining a land-use land-cover image of the plurality of cells, and the sending information relating to conditions within the plurality of cells to the network entity comprises sending the land-use land-cover image to the network entity.

According to some examples the land-use land-cover image is in a horizontal geographical plane.

According to some examples the method further comprises obtaining information of one or more antenna beam patterns within the plurality of cells, and the sending information relating to conditions within the plurality of cells to the network entity comprises sending the one or more antenna beam patterns to the network entity.

According to some examples the camera image information comprises object recognition information.

According to some examples the method comprises, when comparing the first information and the second information, giving a higher weighting to the first information.

According to some examples the first information is in the form of a first image that has been generated by the network entity and the second information is in the form of a second image that has been prepared by the network entity, and the comparing comprises comparing one or more tiles in the first image with one or more tiles in the second image.

According to some examples the method comprises sending information of the determined neighbour cell relations to one or more of: a network management system; an operator.

According to some examples the method is carried out by an apparatus, wherein the apparatus comprises a C-SON apparatus and the network entity comprises an MDAS entity.

According to another aspect there is provided a computer program comprising instructions for causing an apparatus to perform at least the following: sending information relating to conditions within a plurality of cells to a network entity, the information relating to conditions within the plurality of cells comprising at least camera image information; and in response to the sending information; receiving first information from the network entity, the first information comprising information of measured radio conditions within the plurality of cells; receiving second information from the network entity; the second information comprising information of predicted radio conditions within the plurality of cells; comparing the first information and the second information to determine areas of correspondence between the first information and the second information; and based at least in part on the comparing, determining neighbour cell relations within the plurality of cells.

According to another aspect there is provided a computer program comprising instructions stored thereon for performing at least the following: sending information relating to conditions within a plurality of cells to a network entity, the information relating to conditions within the plurality of cells comprising at least camera image information; and in response to the sending information; receiving first information from the network entity, the first information comprising information of measured radio conditions within the plurality of cells; receiving second information from the network entity; the second information comprising information of predicted radio conditions within the plurality of cells; comparing the first information and the second information to determine areas of correspondence between the first information and the second information; and based at least in part on the comparing, determining neighbour cell relations within the plurality of cells.

According to another aspect there is provided a non-transitory computer readable medium comprising program instructions for causing an apparatus to perform at least the following: sending information relating to conditions within a plurality of cells to a network entity, the information relating to conditions within the plurality of cells comprising at least camera image information; and in response to the sending information; receiving first information from the network entity, the first information comprising information of measured radio conditions within the plurality of cells; receiving second information from the network entity; the second information comprising information of predicted radio conditions within the plurality of cells; comparing the first information and the second information to determine areas of correspondence between the first information and the second information; and based at least in part on the comparing, determining neighbour cell relations within the plurality of cells.

According to another aspect there is provided a non-transitory computer readable medium comprising program instructions stored thereon for performing at least the following: sending information relating to conditions within a plurality of cells to a network entity, the information relating to conditions within the plurality of cells comprising at least camera image information; and in response to the sending information; receiving first information from the network entity, the first information comprising information of measured radio conditions within the plurality of cells; receiving second information from the network entity; the second information comprising information of predicted radio conditions within the plurality of cells; comparing the first information and the second information to determine areas of correspondence between the first information and the second information; and based at least in part on the comparing, determining neighbour cell relations within the plurality of cells.

According to another aspect there is provided an apparatus comprising means for performing: receiving, from a network entity, information relating to conditions within a plurality of cells, the information relating to conditions within the plurality of cells comprising at least a camera image; using the received information relating to conditions within the plurality of cells to generate first information, the first information comprising information of measured radio conditions within the plurality of cells; using the received information relating to conditions within the plurality of cells to generate second information, the second information comprising information of predicted radio conditions within the plurality of cells; and sending the first and second information to the network entity.

According to some examples, the received information relating to conditions within the plurality of cells further comprises a minimization of drive test image and a land-use land-cover image.

According to some examples, the means are further configured to perform bringing the minimization of drive test image and the land-use land-cover image to a same scale and colour gradient format.

According to some examples, the means are further configured to combine the minimization of drive test image, the land-use land-cover image, and the camera image to generate the first information.

According to some examples, the means are further configured to perform generating an updated minimization of drive test image and/or an updated land-use land-cover image, when it is determined that there is a discrepancy between information in one or more of the minimization of drive test image, the land-use land cover image and the camera image.

According to some examples, the means are further configured to perform sending the updated minimization of drive test image and/or the updated land-use land-cover image to the network entity.

According to some examples, the received information relating to conditions within the plurality of cells further comprises an antenna beam image.

According to some examples, the means are further configured to use the antenna beam image to generate the second information.

According to some examples, the first information and the second information together comprise information of measured radio conditions in at least one vertical geographical plane and at least one horizontal geographical plane.

According to some examples, the apparatus comprises an MDAS or MDAF apparatus and the network entity comprises a C-SON entity.

According to some examples, the means comprises at least one processor; and at least one memory including computer program code, the at least one memory and computer program code configured to, with the at least one processor, cause the performance of the apparatus.

According to another aspect there is provided an apparatus comprising at least one processor; and at least one memory including computer program code; the at least one memory and the computer program code configured to, with the at least one processor, cause the apparatus at least to perform: receiving, from a network entity, information relating to conditions within a plurality of cells, the information relating to conditions within the plurality of cells comprising at least a camera image; using the received information relating to conditions within the plurality of cells to generate first information, the first information comprising information of measured radio conditions within the plurality of cells; using the received information relating to conditions within the plurality of cells to generate second information, the second information comprising information of predicted radio conditions within the plurality of cells; and sending the first and second information to the network entity.

According to another aspect there is provided an apparatus comprising: circuitry for receiving, from a network entity, information relating to conditions within a plurality of cells, the information relating to conditions within the plurality of cells comprising at least a camera image; circuitry for using the received information relating to conditions within the plurality of cells to generate first information, the first information comprising information of measured radio conditions within the plurality of cells; circuitry for using the received information relating to conditions within the plurality of cells to generate second information, the second information comprising information of predicted radio conditions within the plurality of cells; and circuitry for sending the first and second information to the network entity.

According to another aspect there is provided a method comprising: receiving, from a network entity, information relating to conditions within a plurality of cells, the information relating to conditions within the plurality of cells comprising at least a camera image; using the received information relating to conditions within the plurality of cells to generate first information, the first information comprising information of measured radio conditions within the plurality of cells; using the received information relating to conditions within the plurality of cells to generate second information, the second information comprising information of predicted radio conditions within the plurality of cells; and sending the first and second information to the network entity.

According to some examples, the received information relating to conditions within the plurality of cells further comprises a minimization of drive test image and a land-use land-cover image.

According to some examples, the method further comprises bringing the minimization of drive test image and the land-use land-cover image to a same scale and colour gradient format.

According to some examples, the method further comprises combining the minimization of drive test image, the land-use land-cover image, and the camera image to generate the first information.

According to some examples, the method further comprises generating an updated minimization of drive test image and/or an updated land-use land-cover image, when it is determined that there is a discrepancy between information in one or more of the minimization of drive test image, the land-use land cover image and the camera image.

According to some examples, the method further comprises sending the updated minimization of drive test image and/or the updated land-use land-cover image to the network entity.

According to some examples, the received information relating to conditions within the plurality of cells further comprises an antenna beam image.

According to some examples, the method further comprises using the antenna beam image to generate the second information.

According to some examples, the first information and the second information together comprise information of measured radio conditions in at least one vertical geographical plane and at least one horizontal geographical plane.

According to some examples, the method is performed by an apparatus, wherein the apparatus comprises an MDAS or MDAF apparatus and the network entity comprises a C-SON entity.

According to another aspect there is provided a computer program comprising instructions for causing an apparatus to perform at least the following: receiving, from a network entity, information relating to conditions within a plurality of cells, the information relating to conditions within the plurality of cells comprising at least a camera image; using the received information relating to conditions within the plurality of cells to generate first information, the first information comprising information of measured radio conditions within the plurality of cells; using the received information relating to conditions within the plurality of cells to generate second information, the second information comprising information of predicted radio conditions within the plurality of cells; and sending the first and second information to the network entity.

According to another aspect there is provided a computer program comprising instructions stored thereon for performing at least the following: receiving, from a network entity, information relating to conditions within a plurality of cells, the information relating to conditions within the plurality of cells comprising at least a camera image; using the received information relating to conditions within the plurality of cells to generate first information, the first information comprising information of measured radio conditions within the plurality of cells; using the received information relating to conditions within the plurality of cells to generate second information, the second information comprising information of predicted radio conditions within the plurality of cells; and sending the first and second information to the network entity.

According to another aspect there is provided a non-transitory computer readable medium comprising program instructions for causing an apparatus to perform at least the following: receiving, from a network entity, information relating to conditions within a plurality of cells, the information relating to conditions within the plurality of cells comprising at least a camera image; using the received information relating to conditions within the plurality of cells to generate first information, the first information comprising information of measured radio conditions within the plurality of cells; using the received information relating to conditions within the plurality of cells to generate second information, the second information comprising information of predicted radio conditions within the plurality of cells; and sending the first and second information to the network entity.

According to another aspect there is provided a non-transitory computer readable medium comprising program instructions stored thereon for performing at least the following: receiving, from a network entity, information relating to conditions within a plurality of cells, the information relating to conditions within the plurality of cells comprising at least a camera image; using the received information relating to conditions within the plurality of cells to generate first information, the first information comprising information of measured radio conditions within the plurality of cells; using the received information relating to conditions within the plurality of cells to generate second information, the second information comprising information of predicted radio conditions within the plurality of cells; and sending the first and second information to the network entity.

BRIEF DESCRIPTION OF FIGURES

Examples will now be described, by way of example only, with reference to the accompanying Figures in which:

FIGS. 9A to 9C illustrate the generation of image data by applying Gaussian functions/masks to points representing relative locations of transmitters;

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIG. 1.

Figure 1:
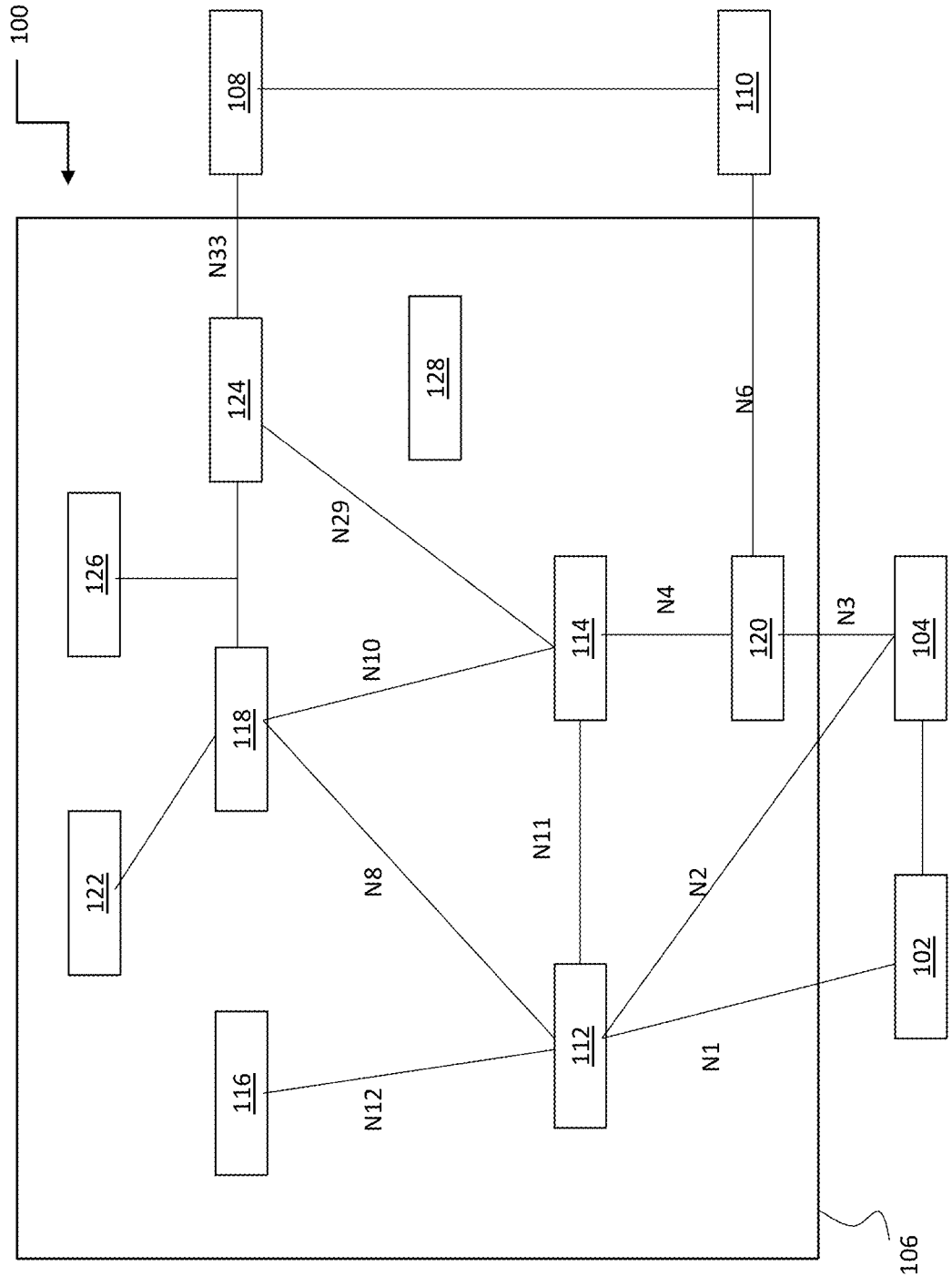
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

3GPP refers to a group of organizations that develop and release different standardized communication protocols. They are currently developing and publishing documents related to Release 16, relating to 5G technology, with Release 17 currently being scheduled for 2022.

Several steps have recently been made in 5G in terms of network automation. Network automation is a process of automating at least one of the configuring, managing, testing, deploying and operating of physical and/or virtual devices within a network. This provides advantages to a network as everyday network tasks and functions may be delegated to respective network automation functions. Network automation functions may be present in both self-organising networks (SON) and cognitive networks.

SONs aim to provide a solution in which each network problem is addressed by a single SON function, and a single SON function may address multiple problems. An SON function is a closed control loop algorithm that acquires data from the network and uses the measurements contained in this data to determine or compute new configuration values for the network (element) according to a set of algorithm internal rules or policies (in the following, these configuration values will be called "network configurations"). In other words, the function is a state machine that matches inputs network key performance indicators (KPIs) to outputs (network configurations). It has fixed behavior in that its input-output relationship, or the path thereto, is predesigned into the solution through the rules of the algorithm (for example, states and state transitions).

Management and coordination of multiple SON functions is performed in a hierarchical manner. For example, SON coordination and management may be performed by non-cognitive centralised functions according to rather fixed rules, or through policies that are created based on fixed rules and input from MNO and SON manufacturer. Such a centralised function will be referred to herein as a centralised-SON.

The Automatic Neighbour Relations (ANR) management is a key feature of Self Organizing Networks (SON). ANR management may be used to minimize the work required for configuration in newly deployed Cells as well as to optimize configuration during operation. ANR in LTE automatically generates relations between radio network entities that is needed for any of a plurality of different features, such as active-mode mobility, load balancing and dual connectivity. Correct and up-to-date neighbouring lists will increase the number of successful handovers and minimize the number of dropped calls.

Maintaining up-to-date Neighbour Cell Relations (NCRs) is a complex problem in 5G, where support for moving cells, e.g. cells mounted on flying drones or vehicles, is also included. Moreover, the complexity for managing NCRs is increased with increasing variety of antennas, beam patterns, and range of cell coverage areas as the communication network and technology develops.

As stated in 3GPP TR 28.861 clause 4.3.2, the neighbour relations, including intra-5G neighbour relations and inter-RAT neighbour relations, are automatically established by the gNB and the management system (e.g. the Operations and Management Function). Clause 5.3.1 from the same document introduces the ANR functionality running at gNB, which is part of Distributed SON (D-SON). Clause 5.4 of this Technical Report explains that the goal of ANR Optimization is to optimize the Neighbour Cell Relations (NCRs) configured at the NG-RAN node. The ANR Optimization function is a consumer of Next Generation (NG)-Radio Access Network (RAN) provisioning management services, and it also subscribes to Performance Management measurements related to mobility management and Radio Link Failure/Radio Resource Control (RRC) connection establishment failure (RCEF) reports. The measurements may include performance indicators as counters of failed and/or dropped RRC connections, handover failures, etc.

3GPP TR 28.861 Section 5.4 presents the Goal, Preconditions and Steps for ANR Optimizations. Section 5.4.3 of this document details the Steps for ANR Optimizations, and mentions that the ANR optimization function gets the geographical data and terrain data of the NR cells from a data source (such as radio planning tool). The ANR optimization function analyses the received data and determines to add or blacklist one or more NCRs.

Existing methods used for ANR have a number of associated problems, particularly when considering moving radio nodes and cells, such as in ANR optimisation for 5GNR.

For example, existing Automated Neighbour Resolution methods are only based on geographical location using techniques such as Triangulation. For moving cells the notion of location is relative and not the same and hence triangulation is not applicable. Identifying neighbours of moving nodes (such as Drone base transceiver stations) will be useful in 5GNR. Using only 2-D geographical parameters (latitude-longitude) for neighbour identification in case of such moving nodes might provide inconsistent results, since the height of a flying cell, is also important and is not considered in existing solutions. Existing methods cater to only terrestrial nodes for neighbour identification, and also have the following additional limitations.

Existing methods do not consider the Radio parameters which might result in incorrect neighbour identification, especially considering the 5GNR network which can consist of a variety of beam forming methods as a result of Multiple Input Multiple Output antenna arrays, smart antennas, etc.

Moreover, existing methods enforce thresholds in terms of the geographical distances between base transceiver stations. For example, base transceiver stations located across two shores of a sea may be neighbours as a result of their wider coverage areas, but cannot be detected as neighbours due to limitations with existing mechanisms that define distance thresholds for neighbours.

The following proposes a mechanism for addressing at least one of the disadvantages of the above-mentioned systems.

In particular, the following discloses a radio-aware image analytics centric method for Automatic Neighbour Relations (ANR) optimization at a Centralized SON (C-SON). This proposed method is generic in that it can be applied in a uniform way across different types of cells, considering a plurality of antenna patterns and/or antenna/beam directions, and may provide an optimized solution including ANR for moving nodes in 5G. Though the following considers the requirements from 5G Radio Networks, it can be applied to all previous Radio Access Technologies in which neighbour identification is useful, and may be similarly applied to future Radio Access Technologies.

As mentioned, the following discloses the application of image analytics for identifying neighbour relations. The image analytics may be performed on 2D and/or 3D images representing antenna beam patterns for a plurality of cells in a region. In particular, the image analytics may be used on such images to determine areas where transmissions from at least two of the cells in the region are likely to overlap.

The images on which the image analytics is performed may be generated using information on the antenna/beam transmission properties of each of the cells being considered. For example, an image may be generated by taking the location of each cell being considered, obtaining transmission parameters for each of those cells (e.g. transmission power, beam/antenna transmission patterns and transmission directions), and using those obtained transmission parameters and locations to generate an image that visually depicts the radio environment in the region being considered.

To this effect, the following also discloses how an image for use with the image analytics may be generated. This may include, in one example, the use of a plurality of Gaussian masks for forming the generated image by applying respective Gaussian masks to points/dots in an image representing the location of respective cells. At least one of the Gaussian masks may be different to one of the other Gaussian masks. The Gaussian masks may be derived using the antenna and/or beam parameters associated with each of the cells in the cluster identified. A Gaussian mask derived using antenna and/or beam parameters associated with a particular cell may be applied to an antenna beam pattern associated with that particular cell, and located on a dot/point in an image that represents a physical location for that particular cell. Different antenna beam patterns may be used for different cells, and also for different beam directions for the same cell. This may reflect the fact that different transmitters/antenna panels have different beam patterns in different directions, and that different transmitters may use different antenna panels/antenna arrays.

The image analytics may be applied to 2-dimensional (2-D) images. The image analytics may be applied to 3-dimensional (3-D) images.

For 2-D images, multiple views like top-view, front-view and side-views may be generated for use with the image analytics.

For 3-D images, cell-specific and direction specific 3-D Gaussian Masks can be used for forming the image data on which the image analytics is performed.

Figure 5B:
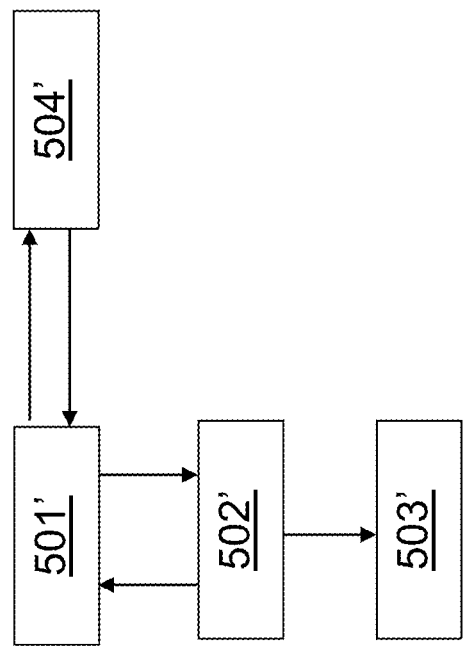
FIGS. 5A and 5B show schematic representation of network entities/connections.
Figure 5A:
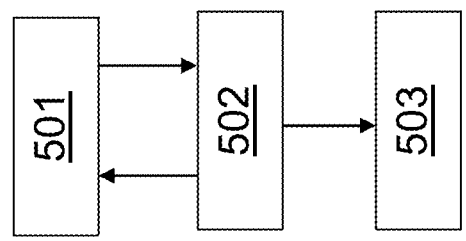

Example of existing architecture is described in relation to FIG. 5A, and an example of architecture in which the presently described techniques may be implemented is described in relation to FIG. 5B.

FIG. 5A is a schematic diagram showing an entity that maintains an ANR table 501, a neighbour management system (NMS) 502, and a Radio Access Network 503.

In this system, the NMS 502 is configured to provide the ANR entity 501 with both location coordinates for cells and cell identifiers. In response to this, the ANR entity provides the cell identifiers and a respective neighbour cell list for all of the cells identified by the NMS 502. The NMS 502 may then use this information to make management-related decisions, which are signalled to the Radio Access Network 503.

FIG. 5B is a schematic diagram showing an entity that maintains an ANR table 501' (such as, for example, a centralised-SON entity), a neighbour management system (NMS) 502', a Radio Access Network 503' (which may include moving nodes), and a Data Analytics function 504'.

In this system, the NMS 502' is configured to provide the ANR entity 501' with both location coordinates for cells and cell identifiers. The NMS 502' is also configured to provide additional information to the ANR entity 501', including, for example, beam width, antenna azimuth and beam power for beams/antennas of the identified cells. In response to this, the ANR entity 501' provides the cell identifiers and a respective neighbour cell list for all of the cells identified by the NMS 502'. The ANR entity 501' may provide this information following signalling with the Data Analytics Function 504'. This signalling may comprise, for example, location coordinates for cells, cell identifiers, beam width, beam direction, antenna azimuth, antenna pattern, and beam power for beams/antennas of the identified cells. The Data Analytics Function 504' may use the provided information for responding to the ANR entity 501' with the cell identifiers, image data visually representing the radio network environment, and a list of neighbour cells for the environment. This may be used by the ANR entity 501' for responding to the NMS 502', as discussed above. The NMS 502' may then use this information to make management-related decisions, which are signalled to the Radio Access Network 503'.

The centralised-SON may thus use Management Data Analytics (MDA) services for Automatic Neighbour Relations (ANR) identification using both radio parameters and geographical parameters of the access points, including Azimuth. The MDA may perform the functions described above with respect to the Data Analytics Function 504'. The centralized-SON could use Management Data Analytics (MDA) services to predict moving antenna or moving cell location at a given point in time, which may also be useful in determining neighbours for ANR tables.

Radio Aware Image Analytics performed at MDA could be applied on the data received from a particular network to arrive at identifying correct neighbors for all the cells from the given network. Other inputs to MDA may include antenna- and beamforming-related information associated with every cell in the network region being analysed.

The MDA's output may contain the list of all the neighbors for each of the cells belonging to the operator's network, as well as a derived generic Gaussian mask-based visual radio environment map (i.e. image data visually representing the radio access network's coverage area. This image data may be derived using a Gaussian mask, as described in more detail below).

At least one network function in the C-SON (e.g. the ANR entity 501' and the NMS 502') may use the identified neighbours for purposes such as, for example, ANR, Physical Cell ID (PCI) (Re)Allocation, Load balancing, Mobile Robustness Optimization (MRO), etc. Neighbour identification for moving/new nodes may also be performed by the MDA based on the required radio parameters sent by C-SON for the same network.

Figure 6:
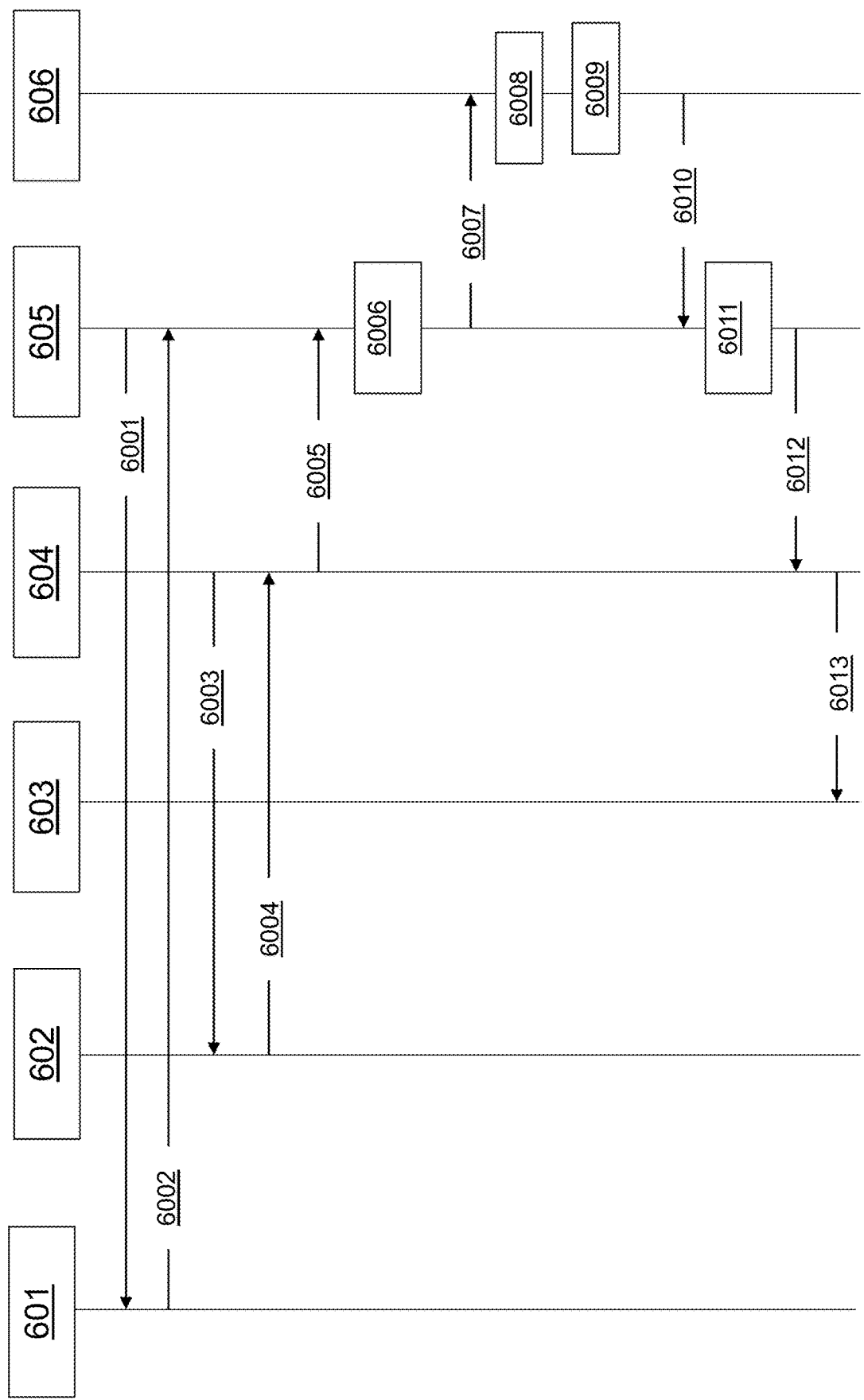
FIG. 6 is an example signalling diagram between network entities.

FIG. 6 is a signalling diagram illustrating potential signalling that may be performed between different entities performing aspects of the described mechanisms.

FIG. 6 shows signalling between a datastore 601 provided by antenna manufacturers, a radio planning function 602, a radio node 603 (i.e. an access point), a management node 604, at least one element of a centralised-SON 605, and a Management Data Analytics (MDA) Function 606.

At 6001, the C-SON element 605 signals the datastore 601, requesting at least one antenna pattern image for at least one type of antenna/antenna manufacturer.

At 6002, the datastore 601 responds to the signalling of 6001 with at least one of the requested at least one image pattern.

At 6003, the Management node 604 sends, to the radio planning entity 602, a request for parameters for at least one cell and/or at least one antenna within a cell. The parameters requested may include at least two of: beam direction, beam width, beam amplitude, antenna azimuth, location coordinates, antenna type, and antenna pattern. The request may be for cell parameters for every cell and/or antenna within a specific region. The specific region may be defined geographically. The specific region may be defined administratively, based on a network-defined region.

At 6004, the radio planning entity 603 responds to the signalling of 6003 with values for the requested parameters.

At 6005, the management node 604 forwards parameters received at 6004 to the centralised-SON 605. The parameters forwarded may relate to at least one cell for which NCRs are to be determined.

At 6006, the centralised-SOPN 605 generates metadata for antenna pattern images for the cell(s) and/or antennas within the cell(s) that are subject to the request of 6005. This metadata may be determined based on the information received at 6002.

At 6007, the centralised-SON 605 sends cell and/or antenna information to the MDA 606. The provided information may comprise at least two of: beam direction, beam width, beam amplitude, antenna azimuth, location coordinates, antenna type, and antenna pattern (i.e. the parameters received at 6005). The information may additionally comprise the metadata generated at 6006.

At 6008, the MDA applies image analytics techniques and generates an output image realising transmission patterns for all of the cells and/or antennas requested.

At 6009, the MDA 606 generates metadata for a final output image representing a region comprising the requested cell(s) and/or antenna(s).

At 6010, the MDA 606 forwards the final output image to the centralised-SON 605.

At 6011, the centralised-SON 605 determines NCRs for the cells/antennas relating to the parameters of 6006 using the final output image.

At 6012, the centralised-SON 605 signals the management node 604 to configure the NCRs based on the determined NCRs.

At 6013, in response to the signalling of 6012, the management node 604 signals the radio node(s) 603 to configure the NCRs.

The presently described system may be described in terms of Observe-Orient-Decide-Act terminology.

In the observe step, parameters are collected for a group of cells that can be selected by the Operator, and sent to MDA as inputs.

The parameters may be received from a variety of sources. For example, beam direction, beam width, beam power, beam azimuth, location coordinates, and antenna type may be received from radio planning. Antenna Patterns in Horizontal Plane and/or vertical plan(s) may be provided by antenna manufacturers (e.g. in a PNG or BMP format). The choice of mask to be applied (e.g. Gaussian Mask and/or Antenna Pattern Mask may be defined by an operator and/or by an operating specification. It may be signalled by an operator if selected/defined by an operator. There may be no signalling if the mask used is defined by the operating specification (e.g. if a Gaussian mask is always to be used, then no signalling needs to take place).

Metadata in respect of each antenna pattern may also be provided. This metadata may define the image format type (e.g. BMP or PNG), the type of view (e.g. top view or front view), the type of front plane view where applicable (e.g. azimuth-v-latitude or azimuth-v-longitude), and the scale of the image data associated with the antenna pattern (e.g. the length of the main lobe in meters).

In the Orient step, the MDA may perform a new analysis based on location coordinates (latitude-longitude), and parameters received in Observe step. For example, neighbour Relations for each cell in the given input cluster may be determined. The MDA may be configured to provide at least one Visual Radio Environment Map as image data that has been derived with Gaussian/Antenna Pattern based Masks and overlapping regions for Decide step. Metadata associated with the Visual environment map may be provided. For example, the metadata for Visual Radio Environment Map Images may include image format (e.g. BMP .PNG), the type of view (e.g. top view or front view), and, where applicable, the type of front plane view (e.g. azimuth-v-latitude or azimuth-v-longitude).

In the decide step, the centralised-SON may use the visual information from Orient step and the neighbour relations received from Orient step to decide on specific neighbour relationship optimizations. Optionally, the centralised-SON could use only the visual information from Orient step, and make decisions on NCRs based on other business constraints on the network, for e.g., barred cells, etc.

In the act step, the neighbour relationships from the decide step are applied to the network by configuring them into the network More information on specific examples of how the above-described techniques may be implemented is now described.

Figure 7:
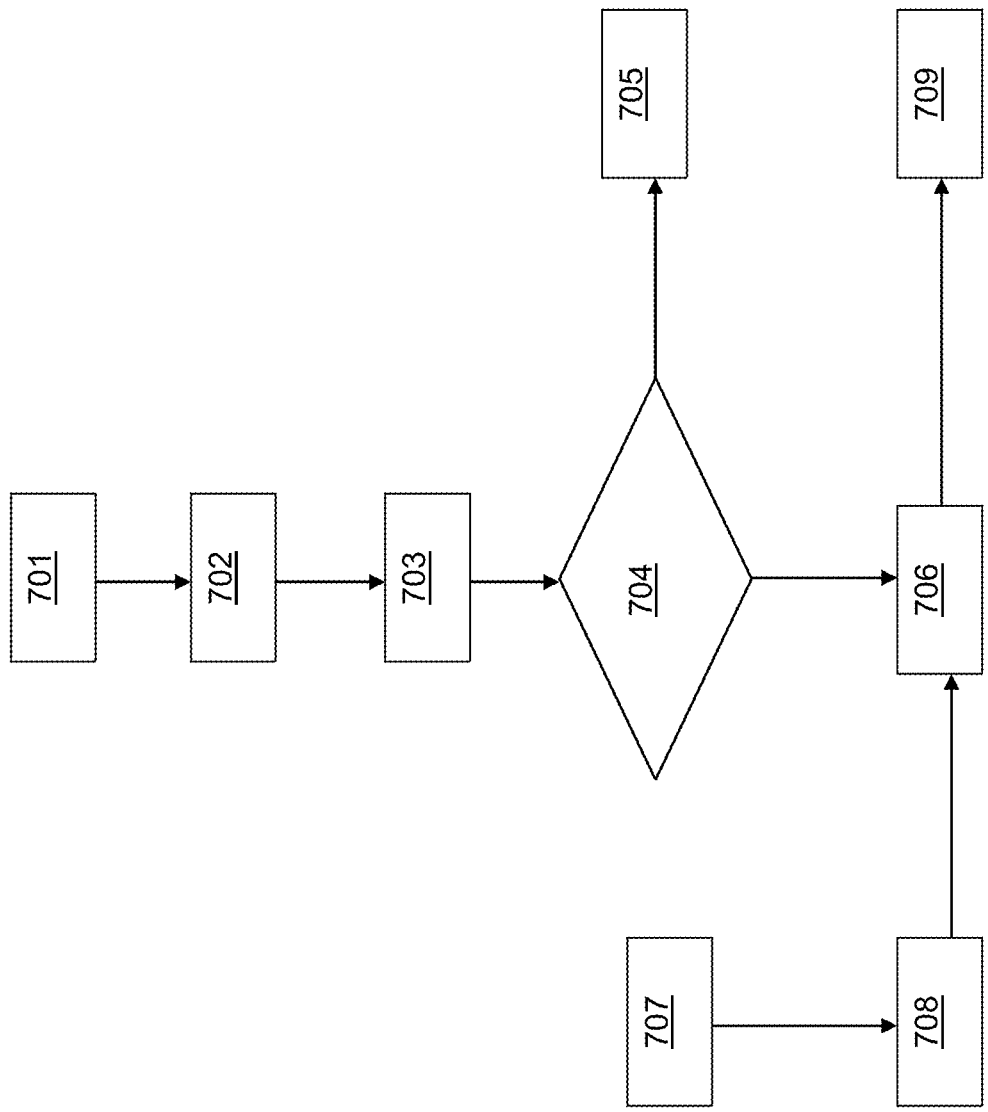
FIGS. 7 and 8 are example flow charts showing potential operations that may be performed by different network entities mentioned herein.

FIG. 7 is a flow chart illustrating potential steps that may be performed by the centralised-SON 605.

At 701, the centralised-SON defines a cluster of cells for which NCRs are to be identified. The cluster of cells may comprise a plurality of cells provided by a single access point. The cluster of cells may comprise a plurality of cells provided by multiple access points, where each of the multiple access points may provide one or more of said plurality of cells.

At 702, the centralised-SON obtains beam power, beam width, location coordinates, azimuth, and antenna type for each of the cells in said cluster of cells. These parameters may be obtained following signalling with other network entities. These parameters may be based on cells provided by their associated access point. For example, the "location" of a cell may be defined the location of the access point providing the cell. The centralised-SON may also obtain an indication of whether a cell is mobile or not. The centralised-SON may be provided with information indicating the mobility of those mobile cells such that the centralised-SON may determine how those mobile cells will change location over time.

At 703, the centralised-SON selects a mask for generating image data. The mask may be selected based on an operator's configuration. The selection of a mask may be a selection between a Gaussian mask and an antenna pattern mask.

At 704, the centralised-SON determines if a Gaussian mask has been selected. If a Gaussian mask is not selected, an antenna pattern mask is applied by default.

If the answer to 704 is in the positive, the centralised-SON proceeds to 705. At 705, the centralised-SON sends to an MDA, for each cell in the cell cluster, a cell identifier, beam power, beam width beam direction, location coordinates, azimuth and an indication of the selected mask.

If the answer to 704 is in the negative, the centralised-SON proceeds to 706. Steps 707 and 708 may be precursors to the execution of 706, so they will be discussed first. It is, however, understood that 707 and 708 may be performed in response to the centralised-SON determining that a Gaussian mask has not been selected.

At 707, the centralised-SON obtains antenna pattern images from various antenna manufacturers.

At 708, the centralised-SON stores the antenna pattern images obtained during 707 in a database readily accessible by the centralised-SON.

At 706, the centralised-SON retrieves antenna pattern images from the database of 708. This retrieval may be performed using information on the antenna type that was obtained during 702. The antenna pattern image(s) retrieved may reflect antenna patterns provided by the antenna type(s) identified in 702.

From 706, the centralised-SON proceeds to 709. At 709, the centralised-SON sends to the MDA, for each cell in the cell cluster, a cell identifier, beam power, beam width beam direction, location coordinates, azimuth, an indication of the selected mask, and antenna pattern images retrieved at 706.

Figure 8:
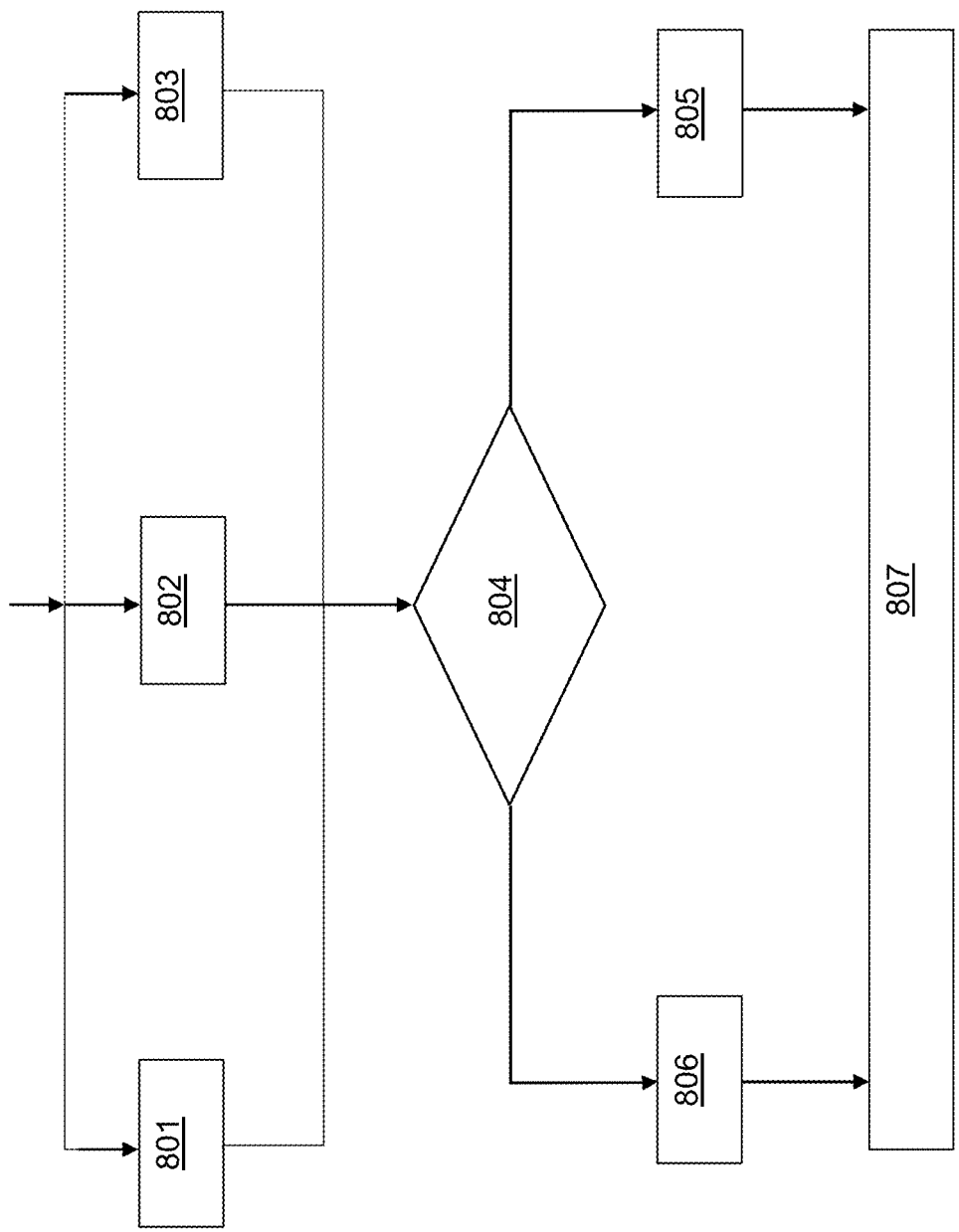

FIG. 8 illustrates potential operations that may be performed by an MDA that receives the information transmitted by the centralised-SON of FIG. 7 (i.e. that receives the information from at least one of 705 and 709).

The MDA routes the received information to each of 801, 802, and 803.

At 801, the MDA uses Azimuth-Latitude information and generates an image representing the Azimuth-Latitude plane with each cell being represented by a dot. This image may be considered as a Front-View Plane 1 for the cluster of cells.

At 802, the MDA uses Azimuth-Longitude information and generates an image representing the Azimuth-Longitude plane with each cell being represented by a dot. This image may be considered as an Front-View Plane 2 for the cluster of cells.

At 803, the MDA uses Latitude-Longitude information and generates an image representing the Latitude-Longitude plane with each cell being represented by a dot. This image may be considered as a Top-View for the cluster of cells.

The generated image information from each of 801 to 803 is provided to 804.

At 804, the MDA determines whether a Gaussian mask is selected. If the answer to this is in the positive, the MDA proceeds to 805.

At 805, for each cell in the cell cluster, the MDA uses beam power as a peak value and beam width as a standard deviation, and generates a cell-specific Gaussian mask using this peak value and standard deviation. The mask is then applied to each dot in the image in the beam direction. This operation is performed on images of all three views. When 805 finishes, it proceeds to 807.

At 807, image information representing the top view, front view plane 1 and front view plane 2 with the applied mask is sent to the centralised-SON. Information identifying possible NCRs based on overlapping regions (as per the masks chosen) may also be identified and sent with the image information. A neighbour may be identified using image processing when overlapping regions are identified in more than one of the views. Cell mobility may also be considered when the overlapping regions are identified.

If the answer to 804 is in the negative, the MDA proceeds to 806, where an antenna mask application is applied as a default.

At 806, for each cell in the cell cluster, the MDA uses beam power as a peak value, and scales each view-specific antenna pattern image according to the scale of the image. The antenna masks for each dot in the image is applied in the beam direction. This operation is performed on images of all three views. When 805 finishes, it proceeds to 807.

As discussed above, at 807, image information representing the top view, front view plane 1 and front view plane 2 with the applied mask is sent to the centralised-SON. Information identifying possible NCRs based on overlapping regions (as per the masks chosen) may also be identified and sent with the image information. A neighbour may be identified using image processing techniques when overlapping regions are identified in more than one of the views. Cell mobility may also be considered when the overlapping regions are identified.

Although the above is discussed in terms of multiple 2D views, it is understood that the analysis may be performed in 3D. For example, 3D image analytics with 3D Gaussian masks can eliminate the need of using image analytics applied on multiple 2D views, and can be more accurate in terms of identifying neighbouring cells.

FIG. 9A is a flow diagram illustrating potential steps that may be performed by the MDA when applying a mask, and includes image data of what the result of each step may be.

At 901, the MDA selects an antenna pattern image, which may be used when antenna masks are selected. The image shown next to 901 represents the antenna pattern image selected in this example.

At 902, the MDA applies a cell-specific Gaussian mask in one direction. The image data shown next to 902 shows that this mask has been applied to the antenna pattern on the right hand side.

At 903, the MDA applies a cell-specific Gaussian mask in a different direction to the direction of 902. The image data shown next to 903 shows that this Gaussian mask has been applied to the antenna pattern on the left hand side.

At 904, the cell-specific Gaussian masks has been applied on all cells (as per 901 to 903), and neighbours are identified based on overlapping regions of the masks. Image data representing this is shown adjacent to 904.

Figure 9B:
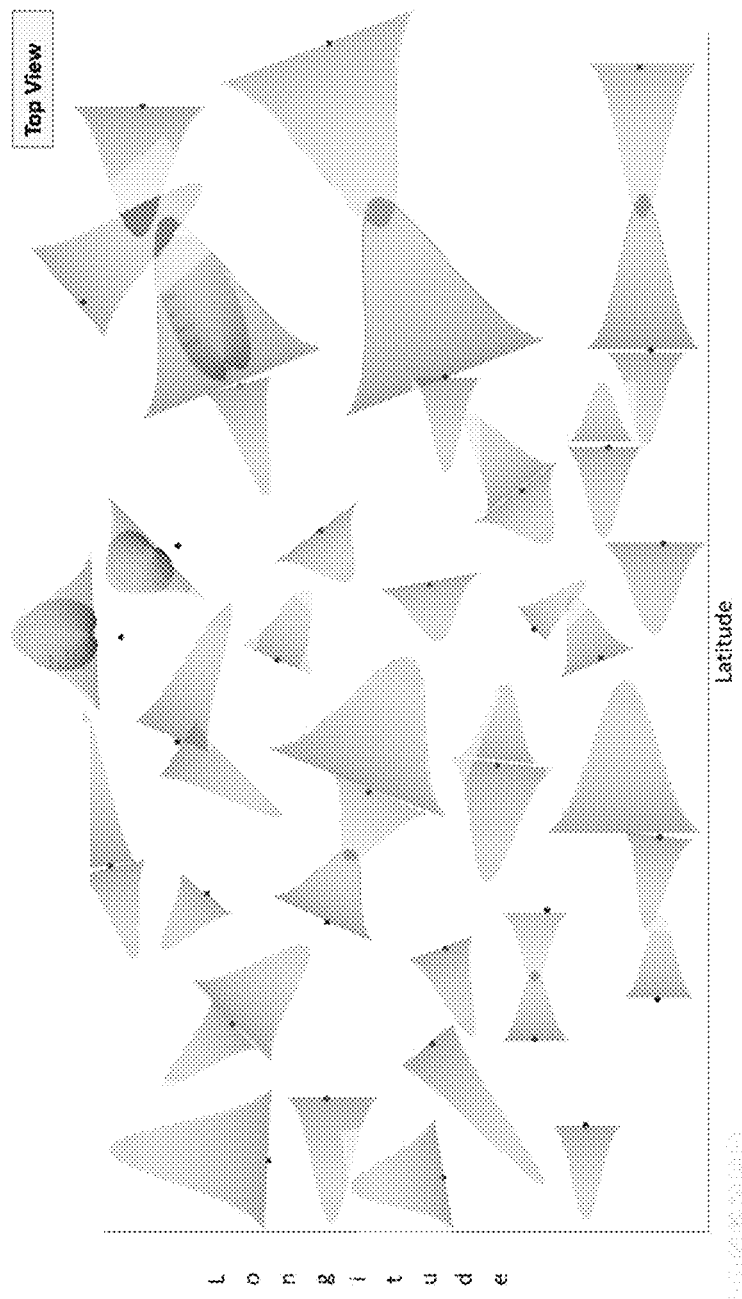
Figure 9C:
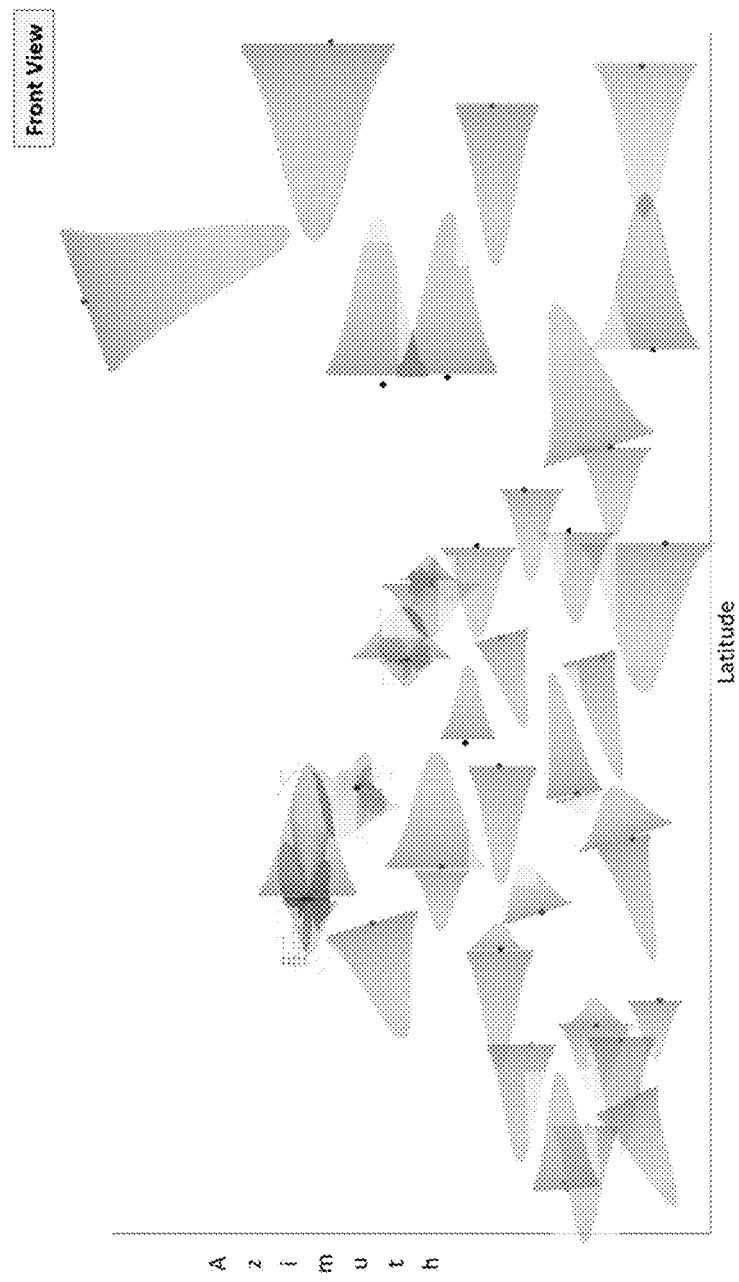

FIGS. 9B and 9C are image data representing example results of the process of 901 to 904.

FIG. 9B shows latitude along the x-axis, and longitude along the y-axis. FIG. 9B is an example top-view that has been formed after applying call-specific Gaussian masks derived based on antenna patterns for the horizontal plane for each cell in the region being considered.

FIG. 9C shows latitude along the x-axis, and azimuth along the y-axis. FIG. 9B is an example front-view that has been formed after applying call-specific Gaussian masks derived based on antenna patterns for a vertical cell each cell in the region being considered.

It is understood that the antenna pattern applied may be different in each plane/each view. Also, depending on the beam direction, Gaussian masks may need to be applied in different directions on the same view (as per the example of 902 and 903). The Gaussian masks applied may be the same in each beam direction. The Gaussian masks applied may be different in each beam direction. For two dimensional images, as discussed above), overlapping regions in one of views may not suffice to indicate a neighbour relation between the cells to which the singly overlapping Gaussian masks belong.

The Gaussian masks applied to each cell may be determined as follows. The amplitude of the Gaussian mask may be determined based on the beam power. The beam direction may determine the direction of application of the Gaussian mask. The beam width may determine the standard deviation of the Gaussian mask. The Gaussian masks may have a gradient colour coding that indicates signal strength variations across the mask. For example, red may be used for areas closest to the cell centre to represent the highest signal strength, with green being used for an outermost colour of the mask to represent the weakest signal strength. Other colour/grey scale gradients may be used to indicate relative signal strengths within Gaussian masks. Where colour coding is used, overlapping regions may be detected by detecting a different colour in the resultant image data, there the different colour is composed of the colours of the two overlapping regions. Image analytics may thus be used to detect these different colours, and therefore to automatically identify neighbour relations. It is understood that this is not a limiting example, and that other image analytics techniques may be used to determine overlapping regions in the final image data. For example, the image data may be searched for non-Gaussian shapes, where a composite shape formed from overlapping Gaussian distributions is not identified as having a Gaussian shape.

Therefore, each cell in the region being analysed (i.e. each dot in the image data provided to the MDA) may be uniquely determined/derived for that cell/dot.

The Gaussian mask approximation may be useful as it may be considered to take care of possible scatters and fading in the radio waves. Moreover, it still provides a generic mask that can provide accurate neighbour detection mechanisms.

The above has described several specific examples and/or aspects of a more general disclosure provided herein, namely the use of image analytics by a network function for automatically determining neighbouring cells. The following presents a generalised overview of the above-mentioned aspects and examples.

Figure 11:
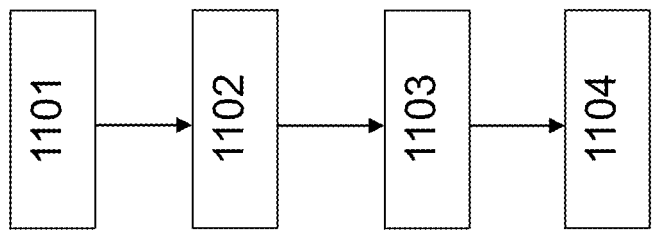
FIGS. 10 to 11 are example flow charts of potential operations that may be performed by apparatus described herein.
Figure 10:
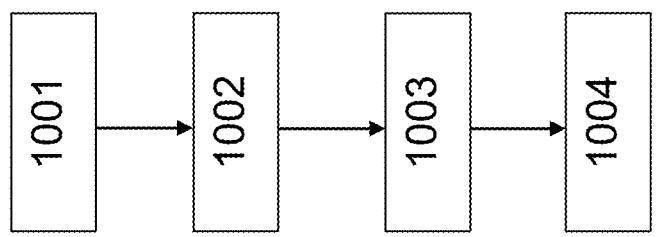

FIGS. 10 and 11 are flowcharts illustrating potential operations that may be performed by apparatus referred to above. These apparatus may interact with each other, as indicated further below.

FIG. 10 is a flow chart illustrating potential operations that may be performed by an apparatus for an analytics producer. The analytics producer may be, for example, an MDAS. In addition to any of the following features, the apparatus for the analytics producer may additionally perform functions referred to above in relation to the MDAS.

At 1001, the apparatus may receive, from a management service, location data associated with each of a plurality of transmitters. The management service may be, for example, an analytics consumer. The management service may be, for example, an entity of the centralized-SON, such as referred to above.

At 1002, the apparatus may receive beam and/or antenna parameters associated with beams provided by the plurality of transmitters.

At 1003, the apparatus may use the received location data and received parameters to generate image data representing transmission ranges of the plurality of transmitters.

At 1004, the apparatus may provide the generated image data to the management service.

At apparatus may receive the beam and/or antenna parameters from the management service.

The beam parameters may comprise at least one of: beam width; beam power; beam direction; antenna type; and antenna azimuth. The antenna parameters may comprise image data representing at least one transmission pattern provided by at least one transmitter of the plurality of transmitters. There may be respective beam and/or antenna parameters for respective beams.

The apparatus may receive, from the management service, an indication that the apparatus should apply a Gaussian function when generating the image data.

The apparatus may generate the image data by, for each of the plurality of transmitters, applying a respective Gaussian function to image data representing the location of said each of the plurality of transmitters. The Gaussian function respectively applied to a particular transmitter's location-based image data may be generated utilising a beam power of the particular transmitter as a peak amplitude, a beam width of the particular transmitter as a standard deviation, and a beam direction as a direction for applying the respective Gaussian function. The Gaussian function may be a three dimensional Gaussian function.

The apparatus function may generate the image data by, for each of the plurality of transmitters, applying a respective antenna transmission pattern to image data representing the location of said each of the plurality of transmitters.

FIG. 11 is a flow chart illustrating potential operations that may be performed by an apparatus for a management service. The apparatus may interact with the apparatus of FIG. 10. The apparatus of FIG. 11 may be an apparatus for an analytics consumer. The apparatus of FIG. 11 may be an apparatus for an entity of a centralized-SON, and perform any of those functions referred to in the above description for the centralized-SON.

At 1101, the apparatus sends, to an analytics producer, location data associated with each of a plurality of transmitters. As mentioned above, the analytics producer may be the apparatus of FIG. 10.

At 1102, the apparatus receives, from the analytics producer, image data representing transmission ranges of the plurality of transmitters.

At 1103, the apparatus uses image analytics techniques on the received image data to determine neighbouring transmitters of the plurality of transmitters.

At 1104, the apparatus uses the determined neighbouring transmitters for configuring radio network transmissions.

The apparatus of FIG. 11 may obtain beam and/or antenna parameters associated with beams provided by the plurality of transmitters, and send, to the analytics producer, the obtained beam and/or antenna parameters. The beam parameters may comprise at least one of: beam width; beam power; beam direction; antenna type; and antenna azimuth. The antenna parameters may comprise image data representing at least one transmission pattern provided by at least one transmitter of the plurality of transmitters. There may be respective beam and/or antenna parameters for respective beams.

The apparatus of FIG. 11 may send, to a radio planning entity, a request for the beam and/or antenna parameters. The radio planning entity may be an entity in the radio access network of the communication system.

The apparatus of FIG. 11 may send, to the analytics producer, an indication that the analytics producer should apply a Gaussian mask when generating the image data.

The apparatus of FIG. 11 may perform said using of image analytics techniques on the received image data to determine neighbouring transmitters of the plurality of transmitters by determining areas of overlap of transmission areas of said plurality of transmitters utilizing at least one colour of the image data. However, it is understood that this is merely one type of image analytics technique that may be performed, and that alternative and/or additional image analytics techniques may be performed as described in the more specific examples discussed above.

The received image data may correspond to multiple planes of view. The apparatus of FIG. 11 may determine that transmitters of the plurality of transmitters are neighbouring transmitters when their respective transmission regions overlap in at least two planes of view.

Figure 2:
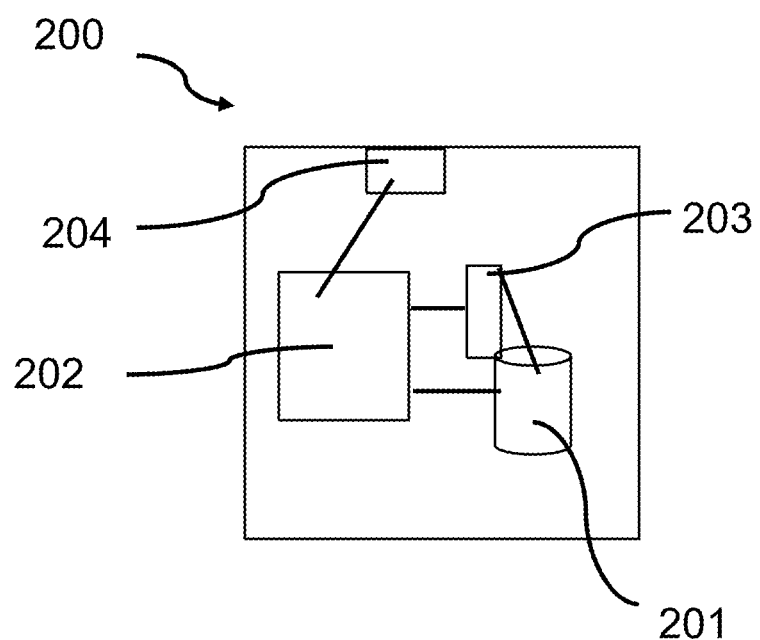
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
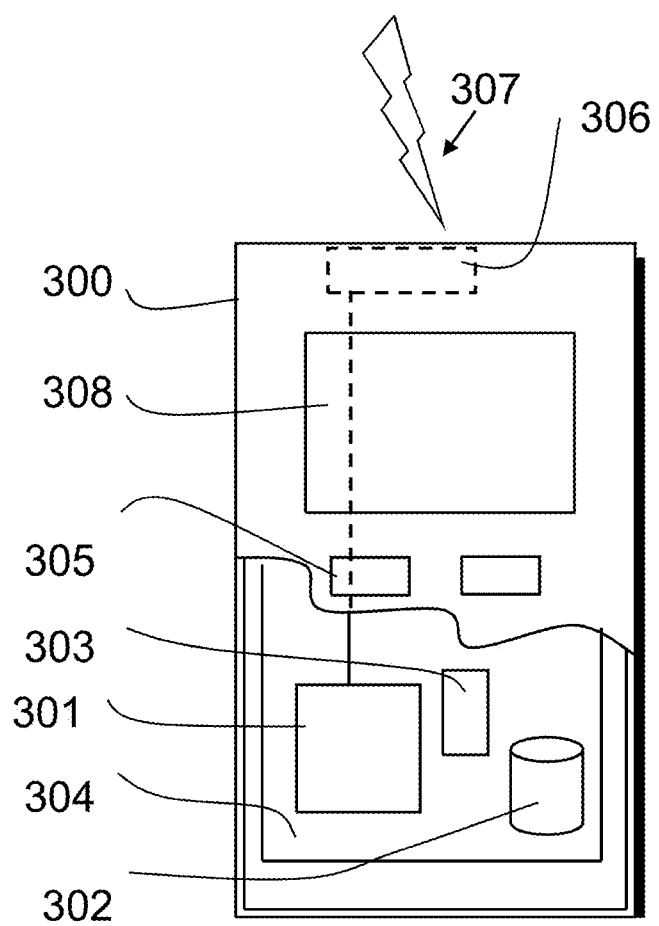
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
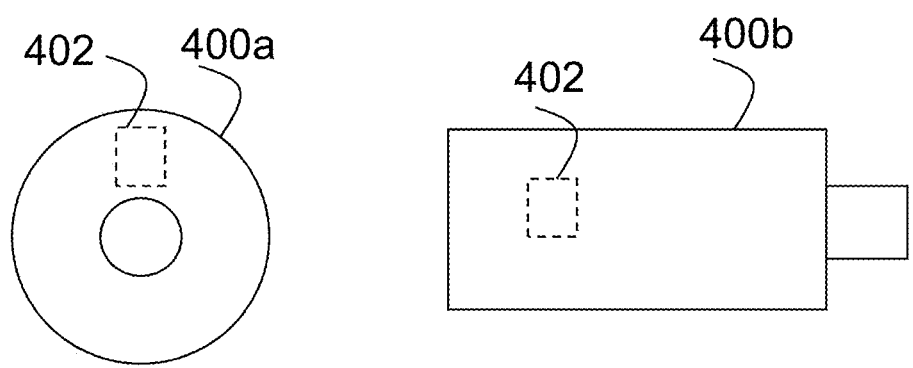
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 10 and/or FIG. 11.

Figure 12:
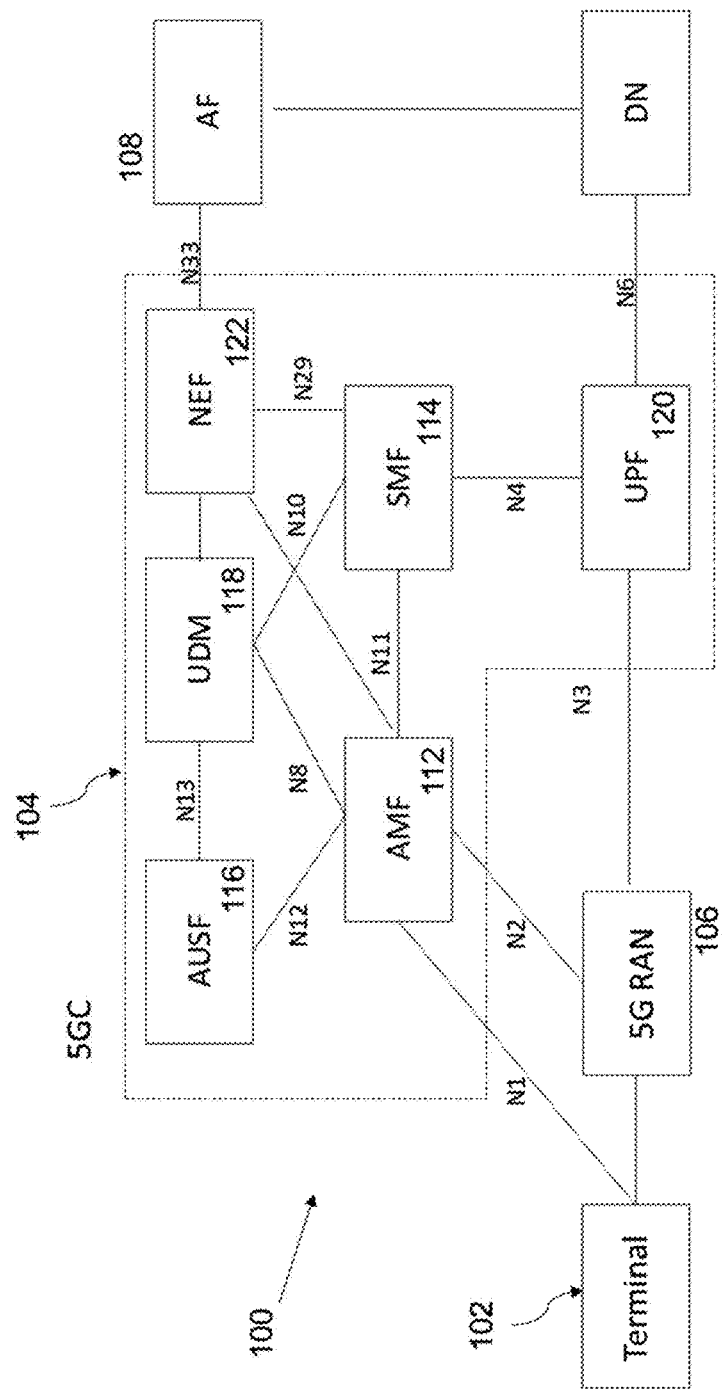
FIG. 12 shows another schematic representation of a 5G system.

FIG. 12 shows another schematic representation of a 5G system (5GS) 100 similar to that of FIG. 1. The 5GS may comprises a terminal 102, a 5G access network (5G-AN) 106, a 5G core network (5GC) 104, one or more network functions (NF), one or more application function (AF) 108 and one or more data networks (DN) 110.

The 5G-AN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs. Some of the examples as shown below may be applicable to 3GPP 5G standards. However, some examples may also be applicable to 4G, 3G and other 3GPP standards.

In a communication system, such as that shown in FIG. 12, mobile communication devices/terminals or user apparatuses, and/or user equipment (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

As discussed above, ANR management and Optimization is a feature of Self Organizing Networks (SON). Neighbour Cell Relations (NCRs) may be considered to comprise information of possible cell handover candidates for a UE. Maintaining up-to-date NCRs may become a complex problem in 5G where support for moving cells, e.g. cells mounted on flying drones or vehicles, is also included. Moreover, the complexity is increased because of the variety of antennas and beam patterns, and a vast range of cell coverage areas.

As stated in 3GPP TR 28.861 clause 4.3.2, the neighbour relations, including intra-5G neighbour relations and inter-RAT neighbour relations, are automatically established by the gNB and the management system. Clause 5.3.1 from the same document introduces the ANR functionality running at gNB, which is part of Distributed SON (D-SON). Clause 5.4 of this TR explains that a goal of ANR Optimization is to optimize the Neighbor Cell Relations (NCRs) configured at the NG-RAN node. The ANR Optimization function is a consumer of NG-RAN provisioning management service and it also subscribes to PM (performance management) measurements related to mobility management and RLF/RCEF reports. The measurements may include performance indicators as counters of failed/dropped RRC connections, handover failures etc.

The following are some identified problems with existing methods used for ANR. These problem may introduce limitations for the scenario of ANR optimization for 5GNR, as well as for moving radio nodes and cells:

Geographical conditions change frequently in various parts of the world. Growth of vegetation or new buildings being built can lead to changes in the radio transmission patterns, and these can impact the neighbour relationships between cells. Existing ANR Optimization methods do not include these aspects automatically.

Existing ANR does not consider inputs from MDT, which could provide useful information about radio coverage aspects of different cells.

Existing ANR does not consider any inputs related to LULC (Land Use/Land Cover). LULC generally refers to the categorization or classification of human activities and natural elements on the landscape within a specific time frame based on established scientific and statistical methods of analysis of appropriate source materials. Land cover refers to the surface cover on the ground such as vegetation, urban infrastructure, water, bare soil etc. Identification of land cover establishes the baseline information for activities like thematic mapping and change detection analysis. Land use refers to the purpose the land serves, for example, recreation, wildlife habitat, or agriculture. Typically, the source of this information is satellite imagery, and has a certain colour coding to indicate, say, vegetation, water-bodies, urban areas, etc.

Existing ANR does not consider any visual inputs captured from cameras. For example such cameras can be attached to antennas at the base stations (BTSs). Visual inputs from cameras attached to BTSs can be the best source of information conveying the dynamics of the physical environment near the radio node. Un-optimized NCRs could lead to ineffective load balancing and mobility robustness.

Existing ANR methods are only based on geographical location of the cells. For moving cells, that are introduced in 5G, the notion of location is relative and not the same, and hence methods like triangulation are not applicable.

Existing ANR methods do not consider the Radio parameters which might result in incorrect neighbour identification, especially considering the 5GNR network which can consist of a variety of beam forming methods ((m)MIMO, Smart Antennas etc.) Existing ANR methods need to enforce thresholds in terms of the geographical distances between BTSs. For example, BTSs located across two shores of a sea maybe neighbours because of their wider coverage areas, but cannot be detected as neighbours due to limitations with existing mechanisms, which need to define distance thresholds.

Identifying neighbours of moving nodes (such as Drone BTS) will be required in 5GNR. Existing methods cater to only terrestrial nodes for neighbour identification.

Using only 2-D geographical parameters (lat-long) for neighbour identification in case of moving nodes such as Drone BTS might provide inconsistent results. For example, the height of a flying cell, i.e. 3-D geographical parameters, are also important and not considered in existing ANR methods.

In summary, the present disclosure proposes a multi-parameter (or multi-factorial) method for ANR optimization. The multi-parameter ANR may include usage of any two or more of: LULC; MDT measurements; images from cameras (e.g. cameras attached to antennas); radio parameters of the cell. The multi-parameter ANR may facilitate accurate and periodic optimization of NCRs. The disclosure also proposes an image analytics based approach. The image based approach may help with taking in to account moving cells in 5G, and also future evolutions. As will be appreciated from the foregoing, the disclosure enables automated inputs to ANR of the physical environmental dynamics, like rapid industrialization, de-forestation and afforestation, and helps reduce the need for frequent drive tests.

Figure 13:
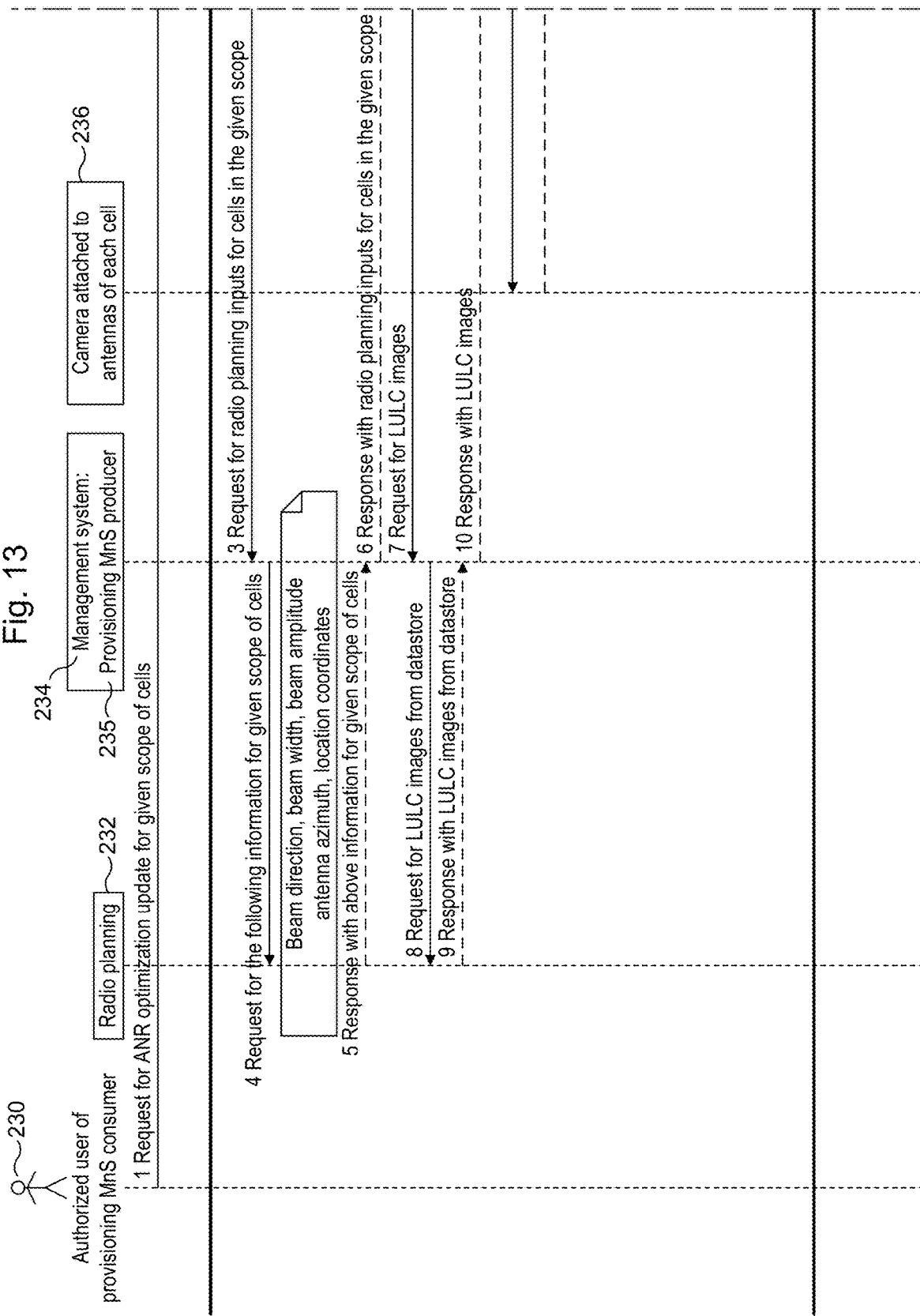
FIG. 13 is a signalling diagram of a method according to an example.
Figure 13:
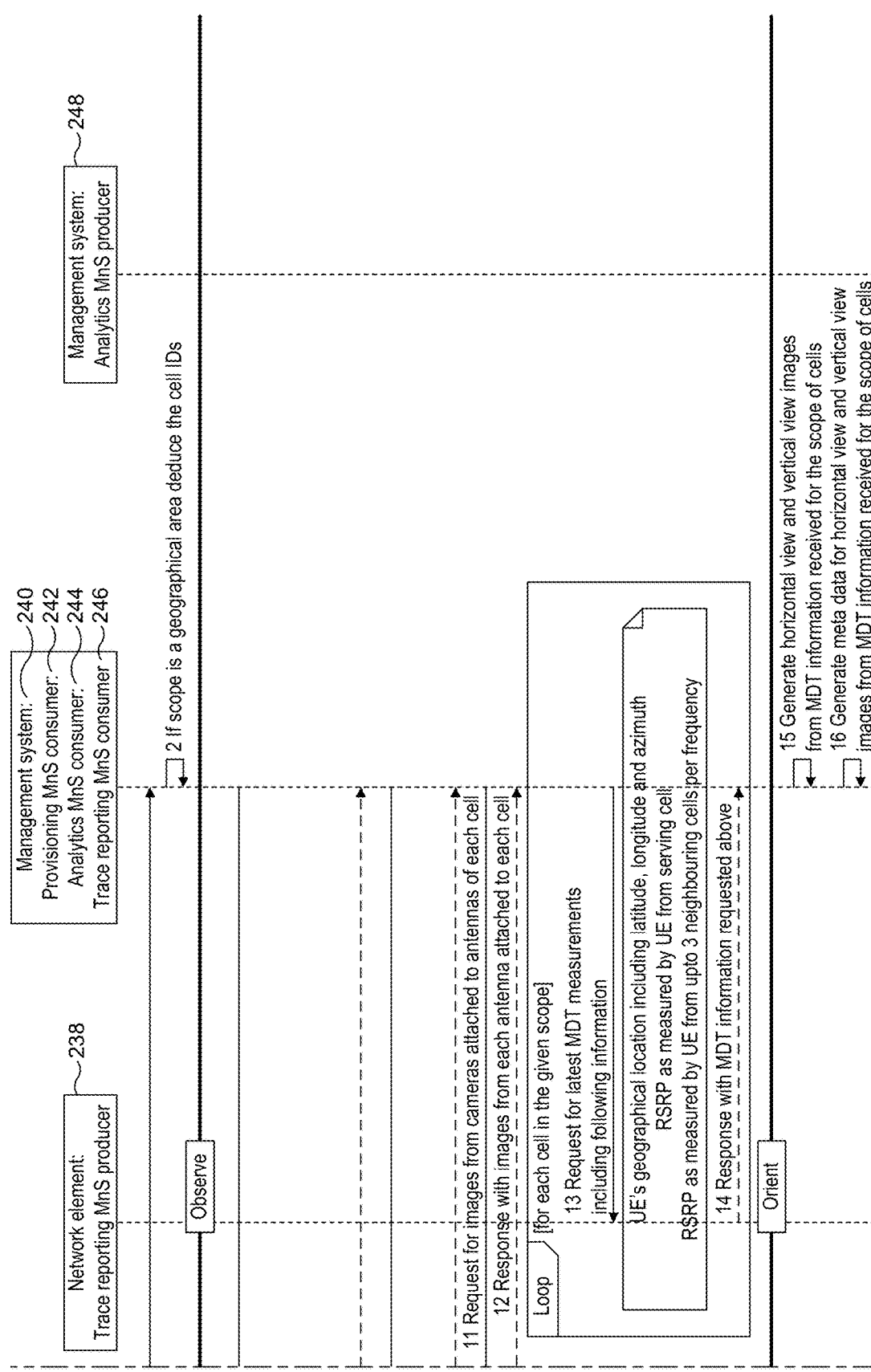
Figure 13:
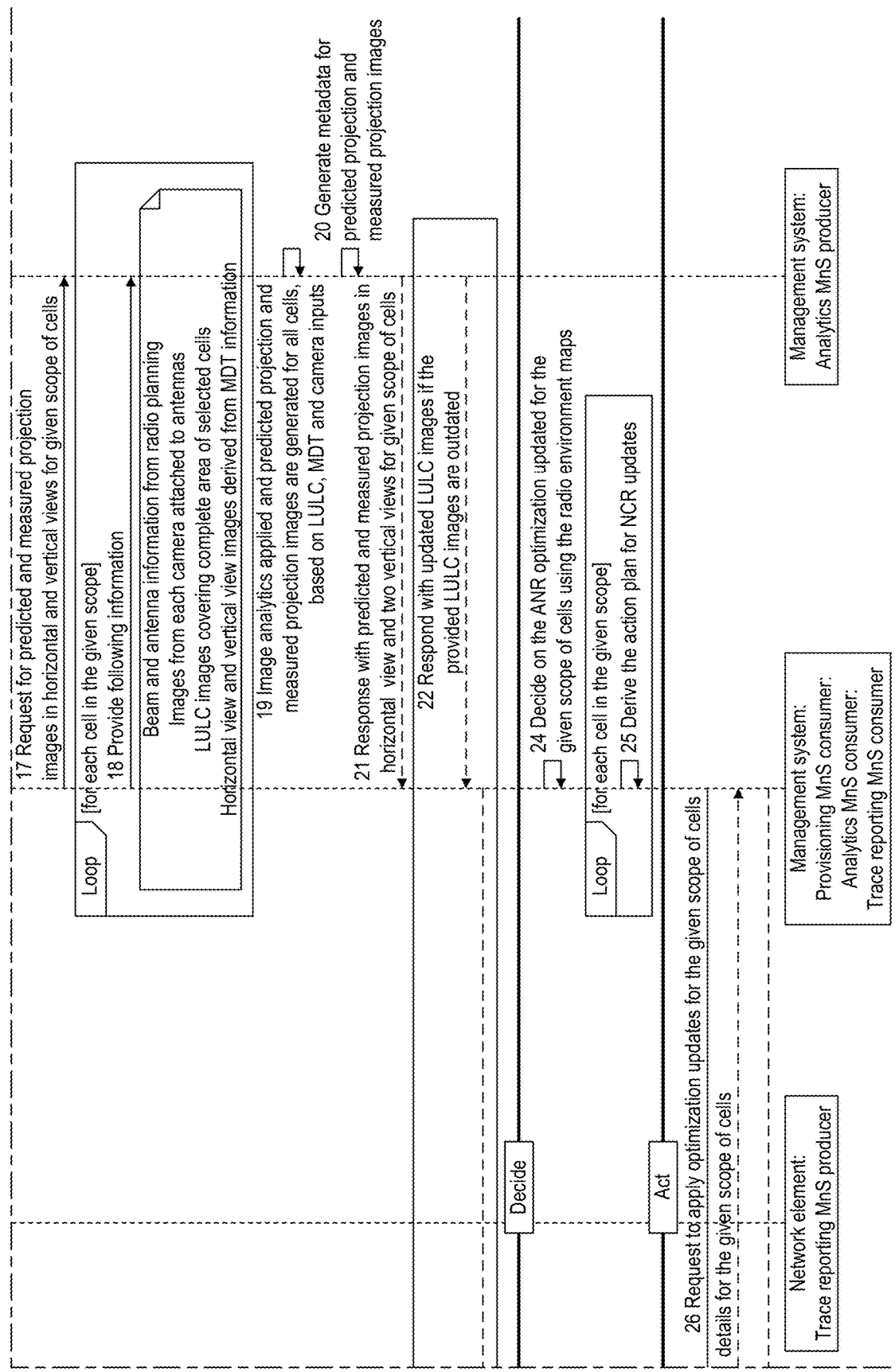

FIG. 13 provides an overall message sequence according to an example. In FIG. 13 are shown Authorized user of provisioning MnS (management service) consumer 230; radio planning entity 232; a network management system 234, which comprise provisioning MnS producer 235; cameras attached to antennas 236; a trace reporting MnS producer 238; a management system consumer 240 (which is C-SON once established, and therefore may be referred to as C-SON 240), which comprises a provisioning MnS consumer 242, a analytics MnS consumer 244, and a trace reporting MnS consumer 246; and a management system producer MDAS (management data analytics service) 248. Entity 248 may also be considered an MDAF (management data analytics function). In some examples MDAS is an API, whereas MDAF is the entity that implements the analytics functionality. Steps of FIG. 13 are set-out in detail below.

1. Operator (e.g. MnS consumer 230) requests C-SON (centralized-SON) for ANR Optimization Updates to be performed for a given scope of cells. By way of non-limiting example, in some examples the scope of cells can be defined as one or more of: a geographic region, a list of Cell IDs.
2. If, in step 1., the Operator defines the scope of cells as a geographic region, C-SON 240 can derive the list of Cell IDs.
3. C-SON 240 then requests the NMS 234 to collect inputs from radio planning entity 232 for the cells in the given scope.
4. NMS 234 then requests the following inputs from Radio Planning entity 232 for each of the cells mentioned. This includes one or more of the following for each cell:
   a. Beam Direction
   b. Beam Width
   c. Beam Amplitude
   d. Antenna Azimuth
   e. Location Coordinates of the cell
5. Requested parameters for each cell are provided by Radio Planning 232 to NMS 234.
6. NMS 234 provides all the information from Radio Planning unit to C-SON 240.
7. C-SON 240 requests LULC images from NMS 234
8. NMS forwards this request for LULC images to Radio Planning 232
9. Radio Planning entity 232 responds to NMS 234 with the LULC images requested
10. NMS 234 then provides these images to C-SON 240.
11. C-SON 240 requests for the images from cameras 236 attached to each antenna attached to each cell within the scope of cells.
12. C-SON 240 receives the requested images from the camera(s) 236 in response to the above request
13. Trace Reporting MnS Consumer 246, which is part of C-SON 240, sends a request for the latest MDT measurements from each cell in the defined scope to trace reporting MnS producer 238. In some examples, the request includes a request for one or more of the following measurements:
    a. UE's geographical location (Latitude, Longitude)
    b. UE's altitude
    c. RSRP (reference signal received power) as measured by UE from serving cell
    d. RSRP as measured by UE from up to 3 neighboring cells per frequency
14. Trace Reporting MnS Producer 238 provides the requested MDT measurements to C-SON 240 for each cell in the defined scope
15. C-SON 240 creates the coverage map images for each of the serving cell and 3 neighboring cells, for horizontal and vertical views. According to examples, "horizontal" means in the latitude and longitude plane (i.e. a plan view of the earth's surface), and "vertical" means in an altitude plane (i.e. a plane perpendicular to the latitude and longitude plane). In other words, the horizontal view may be considered latitude vs longitude; and the vertical view may be considered to be latitude vs altitude and/or longitude vs altitude. The horizontal view may also be referred to as a top view or plan view, and the vertical view may also be referred to as a front view.
16. C-SON 240 generates the following Meta Data for the previously created (at step 15) images for horizontal and vertical views
    a. Image Format (BMP/PNG) (Mandatory)
    b. Type of View (ENUM): (Mandatory)
       i. Top View (0), Front View (1)
    c. Front View Plane (ENUM): (Optional) Needed when type of view is Front view
       i. Azimuth vs Latitude (0)
       ii. Azimuth vs Longitude (1)
    d. Scale of the image: (Mandatory)
       i. Length of main lobe in Meters
17. C-SON 240 sends a Request to MDA 248 (Analytics Services) to provide Predicted and Measured Projection Images, for the given scope of cells, considering LULC, MDT and Camera Image inputs given in subsequent step. The information processing by MDA is described in more detail further below, for example with respect to FIGS. 14 to 18. Predicted projection images comprise a prediction of radio conditions in the given scope of cells. Measured projection images comprise an image based on actual measurements of radio conditions in the given scope of cells. In some examples, radio conditions may relate to transmission patterns. That is, in some examples the predicted projection images show of antenna transmission patterns based on predictions, and measured projection images show antenna transmission patterns based on measurements.

18. For each cell in the scope defined by the operator for ANR optimization, one or more of the following pieces of information is provided by C-SON 240 to MDA 248
   a. Beam Direction
   b. Beam Width
   c. Beam Amplitude
   d. Antenna Azimuth
   e. Location Coordinates
   f. Antenna Type
   g. Antenna Pattern
   h. Images from each camera attached to antennas
   i. LULC images covering complete area of selected cells
   j. Horizontal View and Vertical view Images derived and its Metadata generated from MDT information 19. MDA 248 applies Image Analytics and generates the output image. This provides the updated transmission patterns for the cells in the given scope, based on LULC, MDT and Camera Inputs. Furthermore, according to some examples, one or more of the following may occur:
   a. Beam properties could be used to arrive at the Predicted projection of the transmission pattern. See FIG. 15 and description related thereto for more detail.
   b. Superimposed images from serving cell and neighboring cells MDT measurements provide the reception pattern of the UEs
   c. LULC images contain the geographical area of the cells in the given scope by the Operator
   d. Images from the cameras attached to antennas of the cells in the given scope provide the current status of geographic dynamics. Geographic dynamics refers to features that may change over time e.g. growing trees or new buildings/flyovers etc. being built that can have an impact on radio transmission patterns.
   e. 'b', 'c' and 'd' above can be used to derive a Measured Projection of the transmission pattern. According to some examples appropriate Scaling, alignment and superimposing of the images can be carried out.

20. MDA 248 generates the Meta Data of the Predicted projection (see step 19 'a') and Measured Projection (see step 19 'e') Images 21. MDA 248 responds to C-SON 240 with Predicted projection (step 19 'a') and Measured Projection (step 19 'e') Images, along with its Meta data 22. In some examples this is an optional step. With the Predicted and Measured Projections, MDA 248 generates the LULC images. If the LULC images given as an input is very different from the obtained Image, updated LULC images are responded from MDA 248 to C-SON 240.

23. In some examples this is an optional step. C-SON 248 provides the updated LULC images to Radio Planning entity 238 for further use.

Figure 15:
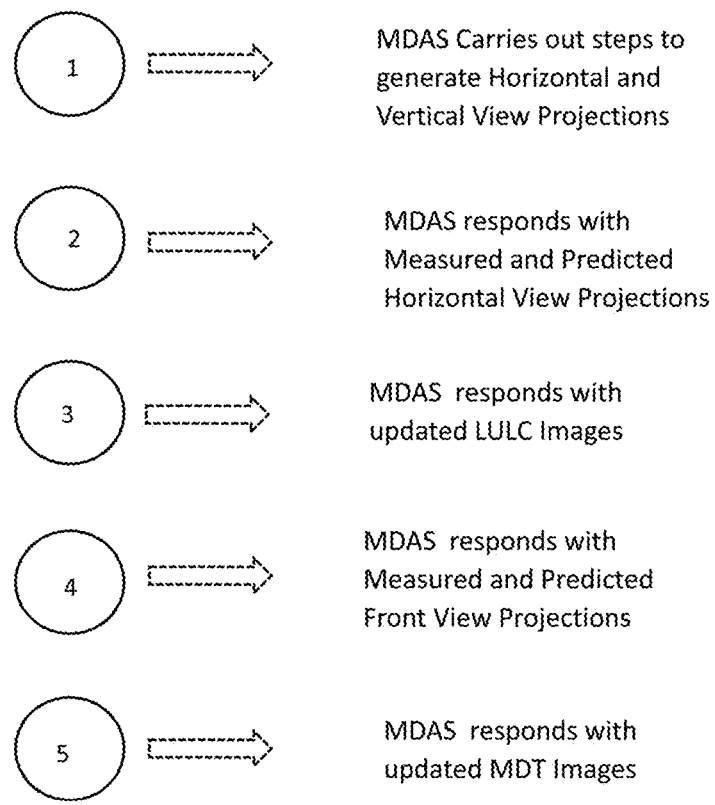
FIG. 15 is a legend that accompanies FIG. 14.

24. C-SON 240 decides on the required ANR Optimization Updates for the given scope of cells by correlating the Predicted and Measured Projection Images
   a. In some examples, predicted Projections are arrived at by using Gaussian Masks according to antenna beam properties, for each cell in the given scope, as illustrated in FIG. 15.
   b. Measured Projections are arrived at by superimposing Gaussian Masks on top of MDT measurement images for each cell in the given scope, as illustrated in FIG. 15.
   c. C-SON 240 receives these images with the same scale and colour gradients for correlations.
      See also the section "Detailed steps performed by C-SON", further below.

25. C-SON 240 Derives the action plan for the NCR updates for each cell in the given scope. In other words, C-SON determines how NCR is to be updated in each cell for the given scope of cells. C-SON identifies which cells need an NCR update, and accordingly initiates communications to the cells via NMS.

26. C-SON 240 Requests NMS 234 to apply the ANR Optimization Updates for the given scope of cells.

27. NMS 234 Responds to C-SON 240 with success/failure details of the ANR Updates requested in Step 24.

28. C-SON 240 Responds to the Operator (e.g. consumer 230) with a Report providing details of the ANR Optimization Updates carried out on the given scope of cells.
      Some specific steps of the overall method will now be described in more detail below.

C-SON

First, step 24 of FIG. 13 will be described in more detail with respect to FIG. 14, where C-SON 240 decides on the required ANR Optimization Updates for the given scope of cells by correlating the Predicted and Measured Projection Images (i.e. correlating images that relate to predicted radio conditions and measured radio conditions).

The method starts at S1.

At S2, CSON 240 collects LULC Images, antenna beam properties, MDT measurement image and camera images (e.g. from cameras on base stations) for each cell in the given scope of cells. The camera image(s) may, for example, comprise photographs taken by the cameras. The camera images may be accompanied by further information, such as object recognition information.

At S3, CSON 240 generates MDT views for the given scope of cells. According to some examples, C-SON generates one or more horizontal views and one or more vertical views for MDT information. Each view may be considered an image. According to an example, C-SON generates one horizontal view (i.e. latitude vs longitude) and two vertical view images (i.e. latitude vs altitude and longitude vs altitude) for MDT information received for the given scope of cells. According to some examples, the RSRP values are added to the MDT image. It may be considered that the RSRP values are superimposed on to one or more tiles that make up the generated MDT images. For example, each tile may cover a geographical area (in horizontal or vertical plane). For example, each tile may comprise a group of pixels which map to a geographical area covered by that tile. In one example, for every tile in the MDT images, the RSRP values of serving cell and 3 neighboring cells are added.

At S4, C-SON 240 generates meta-data for the generated views e.g. for the one horizontal view and two vertical views. As mentioned at point 16 with respect to FIG. 13, the meta-data may comprise:
 a. Image Format (BMP/PNG) (Mandatory)
 b. Type of View (ENUM): (Mandatory)
  i. Top View (0), Front View (1)
 c. Front View Plane (ENUM): (Optional) Needed when type of view is Front view
  i. Azimuth vs Latitude (0)
  ii. Azimuth vs Longitude (1)
 d. Scale of the image: (Mandatory)
  i. Length of main lobe in Meters Then, at S5 the C-SON 240 sends the information of antenna beam properties, LULC images, MDT image and camera images to MDAS.

Then, as shown generally at S6, the MDAS responds, as represented by circles 1 to 5.

As shown by the Legend provided in FIG. 15, in circle 1 the MDAS 248 generates horizontal and vertical view projections.

As shown in circle 2, MDAS then responds to C-SON 240 with measured and predicted horizontal view projections.

As shown in circle 3, MDAS 248 responds to C-SON 240 with updated LULC images. These updated images may be forwarded by C-SON 240 to radio planning entity 232, as shown at S7.

As shown in circle 4, MDAS 248 responds to C-SON 240 with measured and predicted vertical (or front) view projections.

As shown in circle 5, MDAS 248 responds to C-SON 240 with updated MDT images. According to some examples, the input can be further utilized to reduce drive tests for MDT, as shown at S8.

The method then proceeds to S9, where CSON 240 correlates information received from MDAS 248. In some examples, MDAS provides predicted and measured radio projection images to C-SON 240. In some examples, MDAS 248 provides one horizontal view and two vertical views. In some examples, MDAS 248 also: provides updated LULC images in horizontal view only; provides updated MDT images in vertical view only. More particularly, CSON 240 correlates the measured and predicted views from MDAS 248. In examples, the CSON 240 correlates the measured and predicted front view and top view images. This can be considered to comprise 4 sub-steps, as described below:
 1. For each tile in the correlated image, CSON identifies where there is any overlap between neighbouring cells. Overlaps are used to identify definite neighbours. In some examples, there is overlap where two images have a feature in common. For example, in colour images there is overlap where there is a colour match (e.g. two yellow areas). In greyscale images, there is overlap where there are matching greyscale pixel values.
 2. If measured and predicted images show different overlapping regions (e.g. for specific areas/cells), then in some examples measured image overlap is given a higher weightage than the predicted image. For example, a weightage of 60% measured projection and 40% predicted projection may be applied. In some examples, analytics may be used to learn these weightages. Then, a weighted average for each tile in the overlapping region is used to arrive at a correlated image, and neighbour relations are evaluated. Note that in examples MDAS has already ensured alignment in scaling and colour coding of the images it provides.
 3. If neighbour relations are identified in any one of the horizontal view or two vertical view images, a neighbour relationship is identified. In more detail, using the correlated image, C-SON 240 identifies areas of overlap between neighbouring cells, and derives a NCR list for all cells in the given scope of cells. In some examples, overlap in any of the views (e.g. in the one horizontal view image or the two vertical view images), can be considered as a neighbour relation.
 4. A final list of NCRs is then arrived at based on the above steps.

Then, as shown at S10, C-SON 240 configures an updated NCR list based on the acts carried out at S9.

At S11, C-SON 240 sends the updated NCR list to NMS 234 for configuration. In some examples, C-SON receives success/failure details in response, for the given scope of cells i.e. success/failure of NMS to configure the updated NCR in respective cells.

At S12, C-SON 240 sends a report to the authorized C-SON operator, including the ANR optimization details for the given scope of cells.

MDAS

Horizontal Images

There will now be described in more detail a method by which MDAS 248 generates a horizontal (or plan) view image. This may be considered a more detailed explanation of step 19 in FIG. 13. The horizontal view image may be considered a horizontal view image of radio conditions (e.g. transmission patterns) in a particular geographical area or region (e.g. the given scope of cells). For example, the horizontal view image may cover latitude along one axis and latitude along the other axis.

Figure 16:
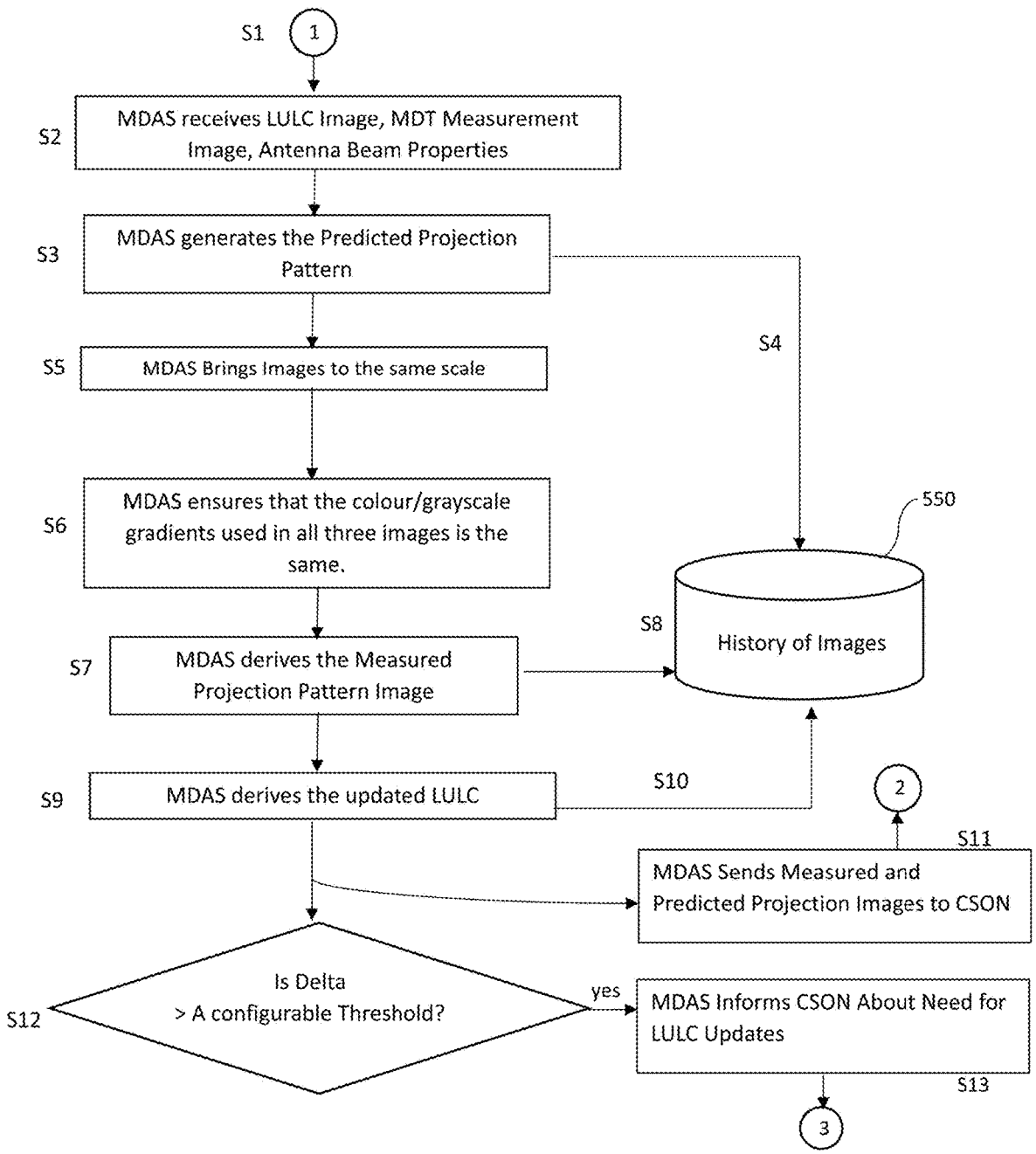
FIG. 16 schematically shows a flow chart of a method of MDA functionality for horizontal view image analytics, according to an example.

With reference to FIG. 16, the method begins at S1.

At S2, MDAS receives an LULC Image, an MDT Measurement Image, Antenna Beam Properties, for the given scope of cells. For example, this information is received from C-SON 240.

In examples, LULC Images provide only horizontal view information, and hence are considered only in horizontal view analytics. LULC images may contain categorical information. The categorical information may include colour coded regions indicating e.g. urban areas, forest, water-body, etc. (of course colour coding is one example, and other forms of identifier may be used). Hence, in examples, the categorical information, along with the MDT measurement images, are utilized in order to arrive at a measured radio pattern projection for the given area.

As shown at S3, MDAS 248 generates a predicted projection pattern of radio conditions for the given scope of cell. In some examples, MDAS does this using antenna beam properties for the given scope of cells. In one example, antenna patterns may be used to derive the predicted projection pattern. In another example, the predicted projection of radio conditions may be obtained using Gaussian masks (explained in more detail with respect to FIGS. 18 and 19A and 19B).

At S4, MDAS 248 sends information of measured and predicted projection images to a data repository 550. The repository 550 may be considered to store a history of measured and predicted projection images.

At S5, MDAS 248 brings the LULC Image, MDT Measurement Image, and Radio Pattern Image (i.e. antenna beam properties) to the same scale, for the given scope of cells.

As shown at S6, in some examples, any colour gradients or grayscale gradients in MDT images and predicted projection images are made consistent. In some examples, grayscale gradient may be preferred over colour gradient for easier image processing.

Figure 17:
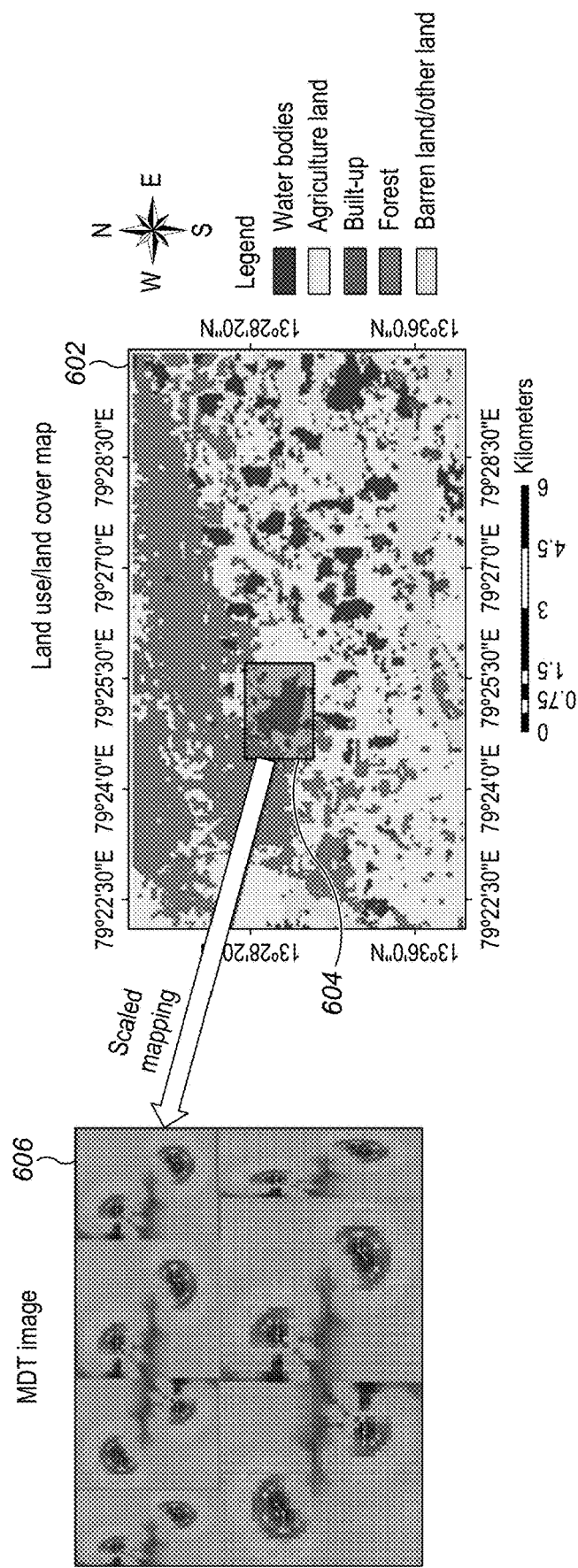
FIG. 17 schematically shows updating of an MDT image, according to an example.

At S7, MDAS 248 combines LULC and MDT images and derives the measured projection pattern image. FIG. 17 shows an example of an LULC image 602 and an MDT image 606. The scope of cells is schematically shown in LULC image 602 at 604. The area of MDT image 606 corresponds to area 604. According to some examples, if any tile in the MDT measurement image indicates a certain radio propagation loss pattern that does not match or sufficiently correspond with the radio propagation loss pattern for the category depicted in LULC image, for the same tile, then it is determined that the LULC information for that tile needs to be updated. For example, a "yellow" tile in MDT measurement image indicates a radio propagation loss pattern that does not match with a surface waterbody indicated in LULC (which typically has a lesser radio propagation loss), it could indicate that the waterbody has been depleted. This would require a LULC image update for the corresponding tile.

As shown at S8, the measured projection pattern image of radio conditions is sent to data repository 550.

At S9, MDAS 248 derives an updated LULC image for the geographic area for the given scope of cells. According to some examples, artificial intelligence or machine learning models is used to derive the image update. The models can learn the loss patterns, and cause the LULC image to be updated accordingly. In some examples, a final MDT image is arrived at by superimposing appropriate gaussian masks for each cell.

As shown at S10, MDAS 248 sends the updated LULC image to repository 550.

At S11, MDAS 248 sends the measured and predicted projection images to C-SON 240. In other words, output of S3 (which is S4) and output of S7 (which is S8) are sent to CSON in this step.

At S12, MDAS 248 performs a determination of whether a difference (delta) between the input LULC image (i.e. the LULC image received at S2) and the final superimposed image (i.e. the updated LULC derived at S9) is above a threshold. If the determination at S12 is "yes" (i.e. difference is above the threshold) then MDAS 248 informs CSON 240 of the need for an LULC update.

Figure 14:
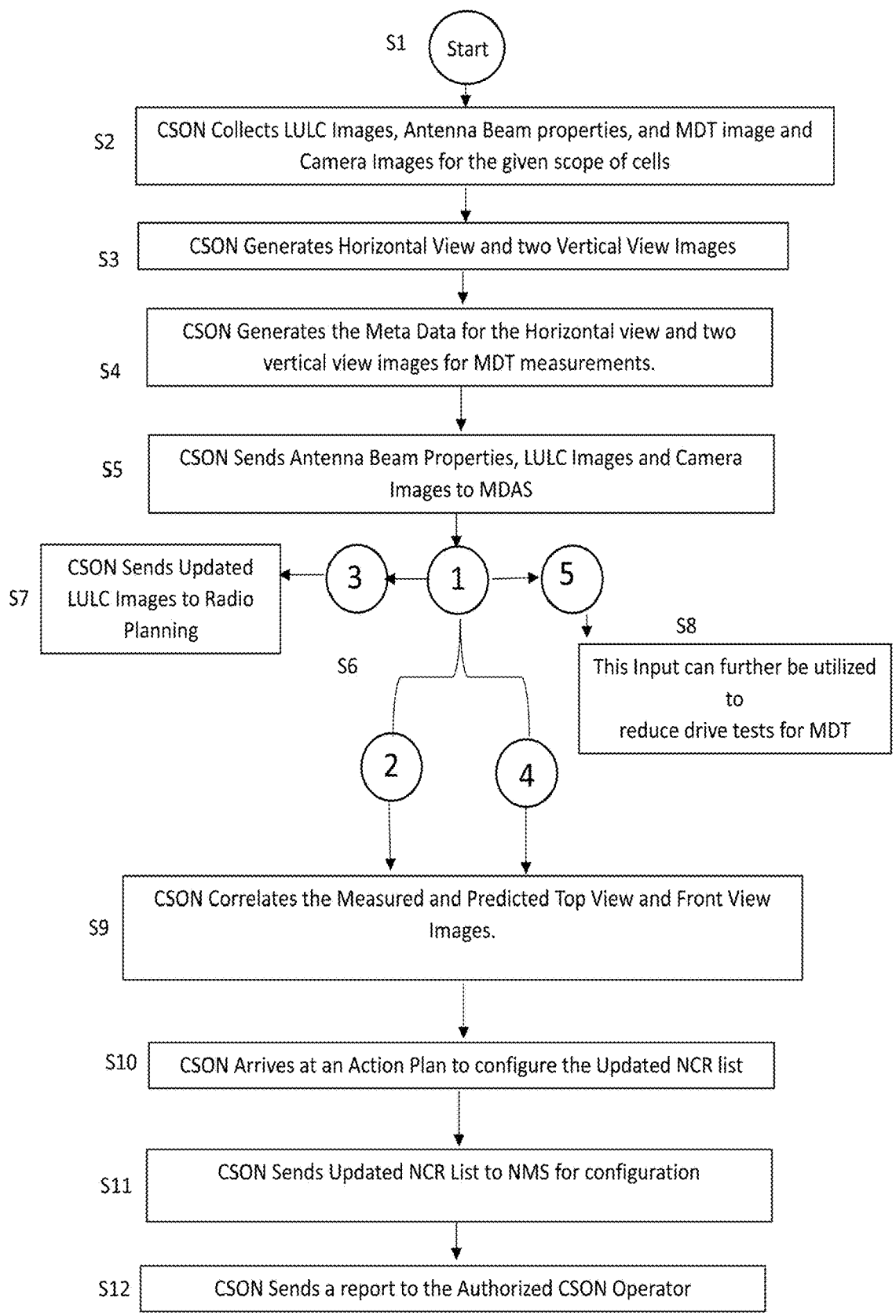
FIG. 14 schematically shows a method performed by a C-SON for ANR optimization updates, according to an example.

The circled 2 and 3 of FIG. 16 correspond to the circled 2 and 3 of FIGS. 14 and 15.

Figure 18:
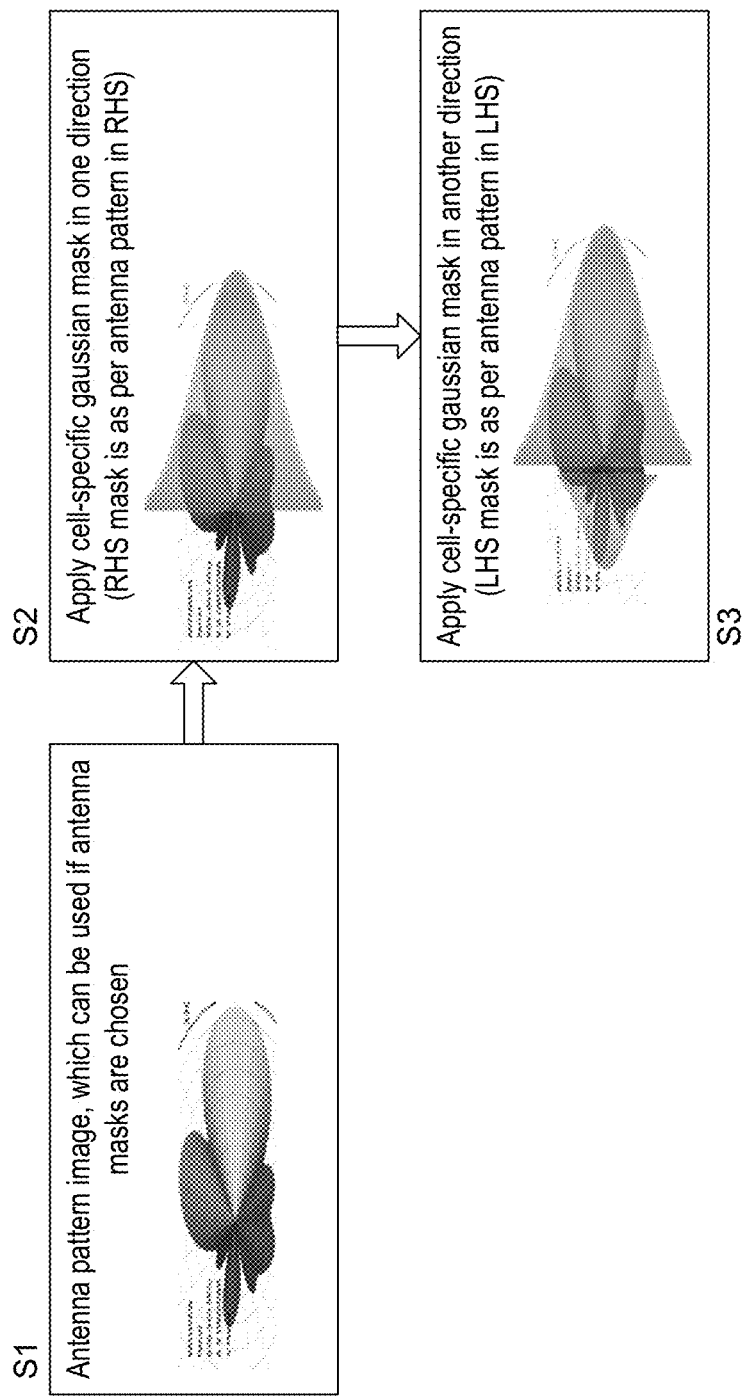
FIG. 18 schematically shows a method for deriving antenna beam projections using gaussian masks, according to an example.
Figure 19A:
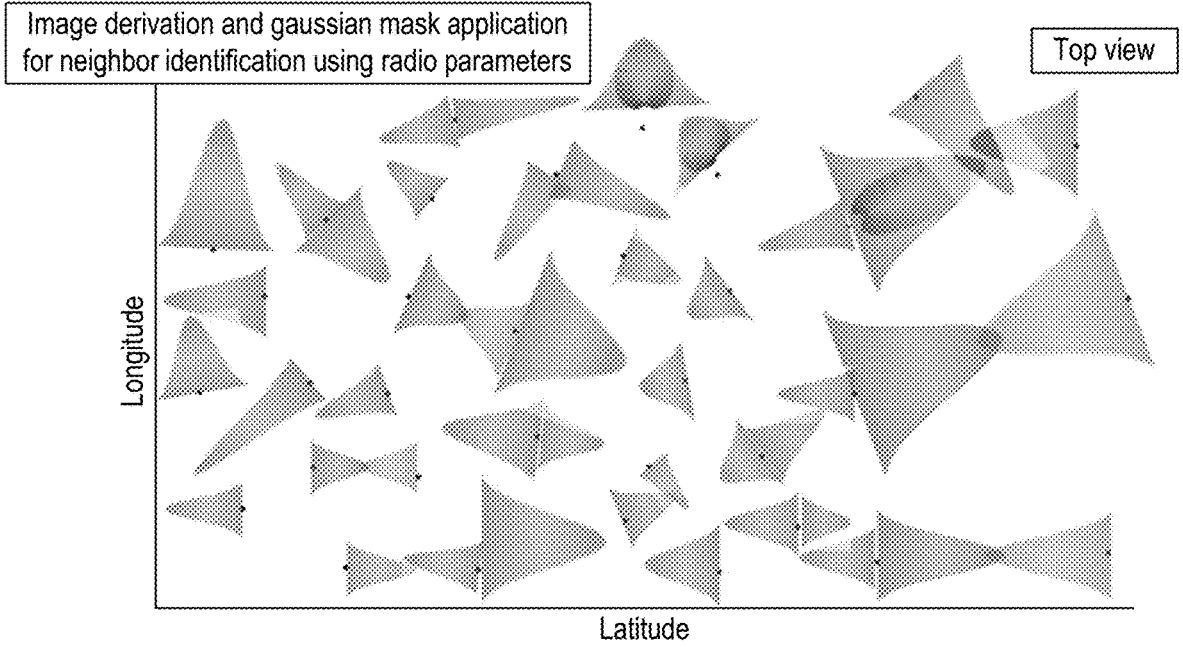
FIGS. 19A and 19B schematically show sample images of a scope of cells, according to an example.
Figure 19B:
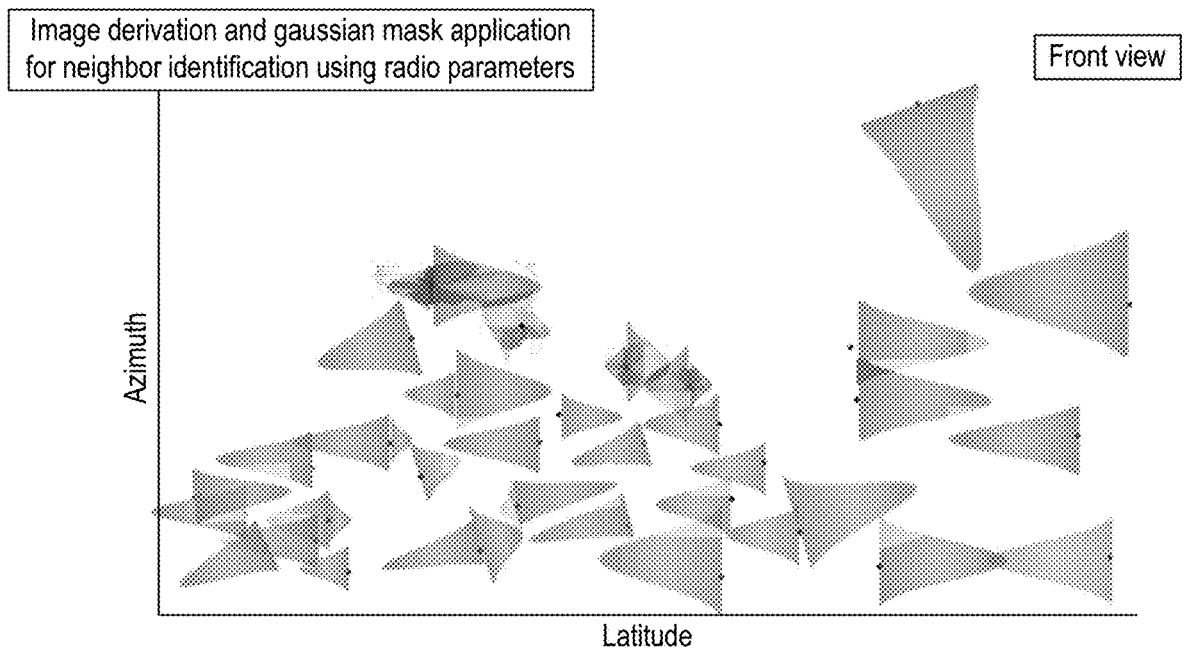

FIGS. 18 and 19A-19B describe a method to derive image projections using Gaussian masks (cf with S3 of FIG. 17).

With respect to FIG. 18, as shown at S1, an antenna pattern image is obtained.

As shown at S2, a cell-specific gaussian mask is applied in one direction (e.g. right hand side mask is as per antenna pattern in right hand side).

As shown at S3, a cell-specific gaussian mask is applied in another direction (e.g. left hand side mask is as per antenna pattern in left hand side).

In some examples, the amplitude of the gaussian mask can be determined based on the beam power. In some examples, beam direction determines the direction of application of the Gaussian mask. In some examples, beam width determines the standard deviation of the Gaussian mask. In some examples, Gaussian mask approximation is considered to take care of possible scatter and fading of the radio waves.

FIGS. 19A and 19B schematically show sample images for a scope of cells for image derivation and gaussian mask application for neighbour identification using radio parameters for top or plan view (FIG. 8) and front or vertical view (FIG. 8). In these images, each dot represents a cell.

Vertical Images

There will now be described in more detail a method by which MDAS 248 generates the vertical view images for the radio conditions in the given scope of cells (again cf with step 19 of FIG. 13).

Figure 20:
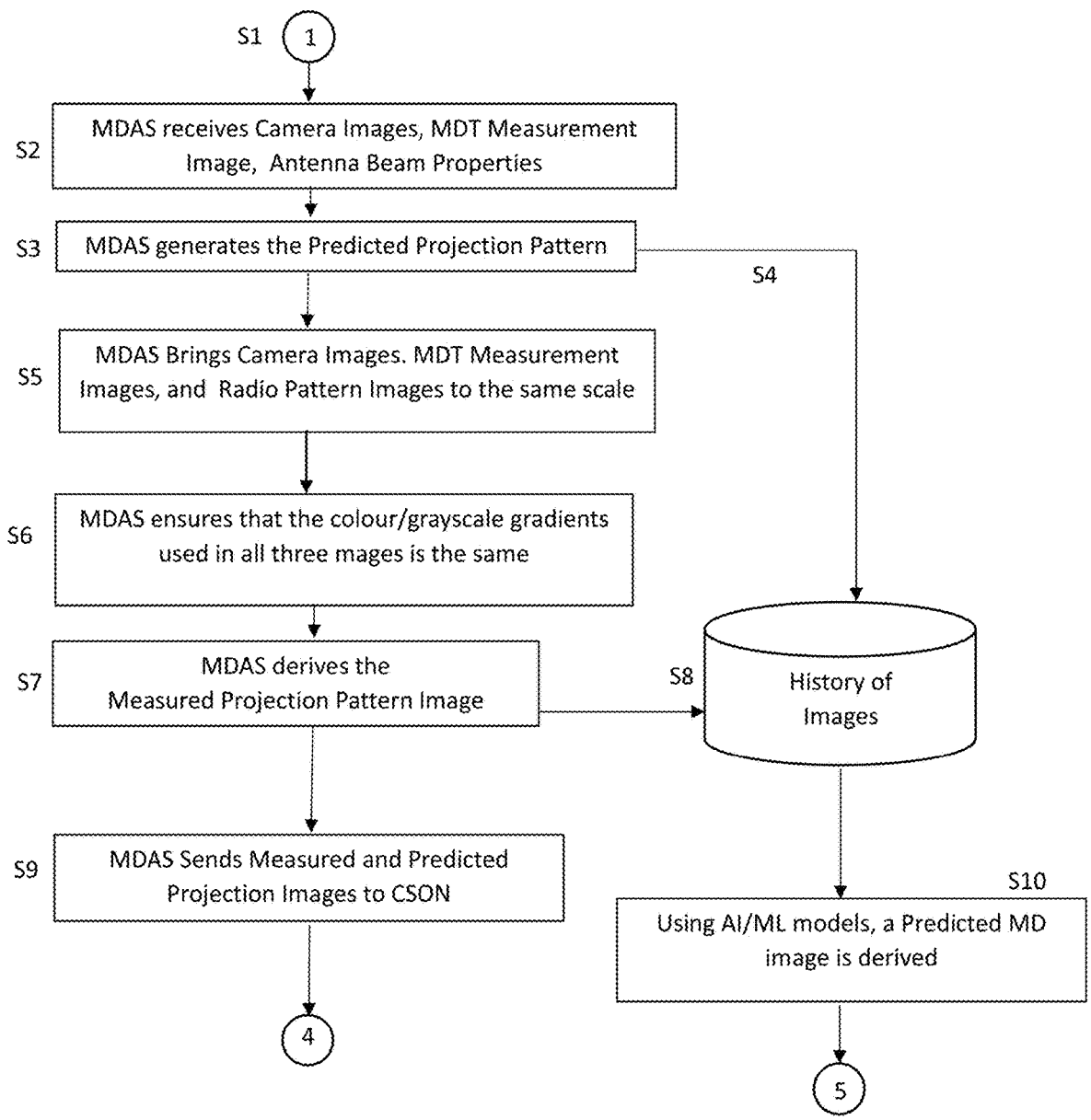
FIG. 20 schematically shows a flow chart of a method of MDA functionality for vertical image view analytics.

With reference to FIG. 20, the method starts at S1.

At S2, MDAS 248 receives camera images (e.g. from cameras located on base stations) and an MDT Measurement Image. Antenna Bean Properties, for the given scope of cells, may also be received. In some examples, this information is received from CSON 240.

At S3, MDAS 248 generates the predicted projection pattern for radio conditions in the given scope of cells. For example, MDAS 248 may use antenna beam properties to do this. As shown at S4, MDAS 248 sends the predicted projection pattern to repository 550.

At S5, MDAS 248 brings camera images. MDT measurement images, and radio pattern images to the same scale, for the given scope of cells.

At S6, MDAS 248 ensures that the colour gradients used in all three images (camera, MDT, and antenna beam) is the same. In some examples greyscale gradient is preferred over colour gradient, for easier image processing.

At S7, MDAS 248 derives object, and if possible, depth information from the camera images. The MDAS 248 correlates the camera images with the MDT images to derive the measured projection pattern image, as explained in more detail below.

As shown at S8, the MDAS 248 sends the measured projection pattern image to repository 550.

As shown at S9, MDAS 248 sends the measured and predicted vertical images to CSON 240.

As shown at S10, using AI or ML models, a predicted or updated MDT image is derived. This can reduce the need for frequent drive tests.

The circled 4 and 5 in FIG. 20 correspond to the circled 4 and 5 of FIG. 14.

Referring back to S7 of FIG. 20, details for correlating camera images and MDT measurements are as follows. Camera images may depend on the abilities of the cameras. Some cameras have image recognition functionality that enables them to identify objects (e.g. buildings). In some examples, cameras that can recognize and indicate depth can also be used, and the depth information can be provided to MDAS to add value to the analytics that MDAS performs. In some examples, cloud APIs are used that can provide probabilities of detected objects. APIs can also process videos including timestamps of frames and details of detected objects in every frame. In some examples, videos captured from cameras can be used to predict the height of a building under construction (for example), and utilize this information for predicting possible changes in radio propagation losses in future. In examples, object information (like buildings and trees) can be utilized to identify obstacles, and thereby adapt the MDT measurements accordingly.

Camera images provide categorical information in terms of objects like buildings, trees etc. MDT images contain measured RSRP values for each tile in the image. Categorical information from camera images with appropriate scaling can be used to adapt the tiles in MDT images. For example, a tile in an MDT image may show an orange colour, which represents relatively low propagation loss. However, a corresponding tile in a camera image may show parts of a new building that was built recently, or is predicted to be there in near future. The colour of that tile can then be changed to e.g. yellow, indicating a greater propagation loss (of course the reference to particular colours here is by way of example only and other indicators of propagation loss may be used).

Depth information from the cameras can be used to arrive at the magnitude of radio propagation losses due to obstacles, for arriving at accurate measured projection patterns. This can provide an estimate of distance to the detected objects, and be compared with information from radio propagation views in MDT images.

According to some examples, for every tile in MDT measurements in the vertical view, if the tile overlaps with an object from the camera images, object specific propagation loss weight is used to adjust the RSRP value depicted by the tile.

Figure 21:
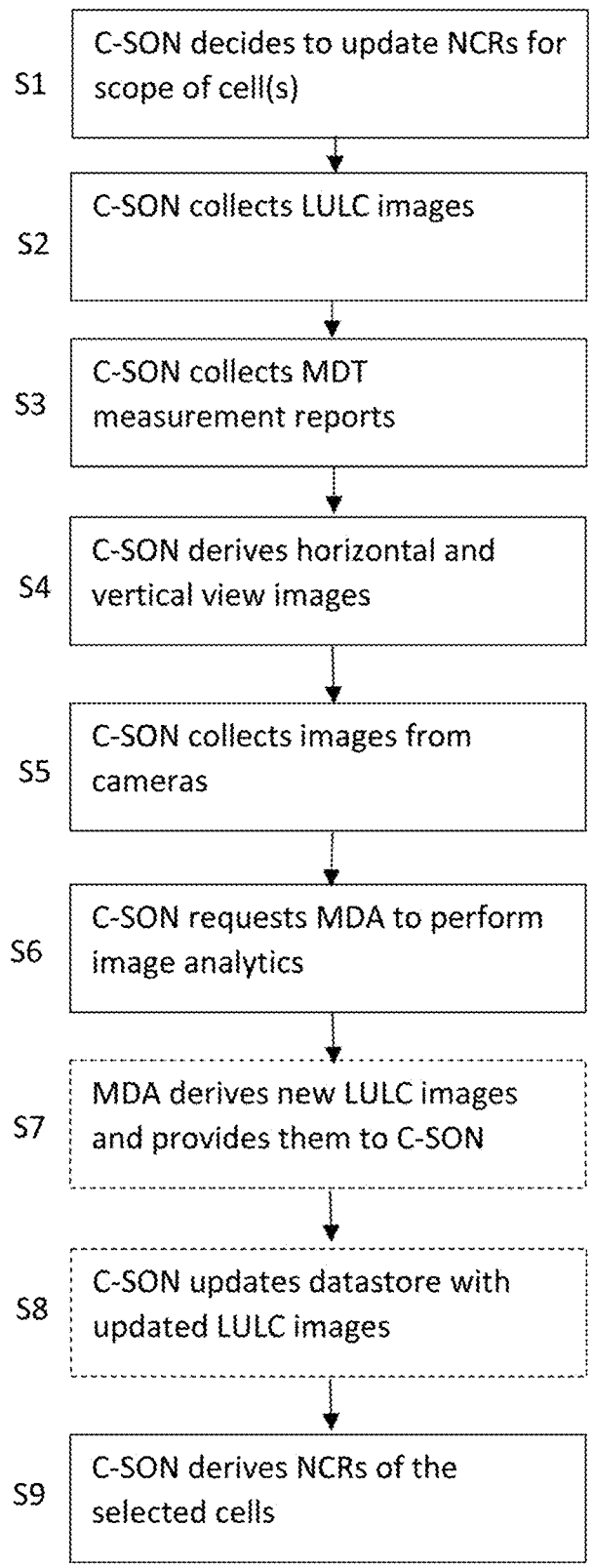
FIG. 21 is a flow-chart of a method according to an example.

The process is summarized in the flow-chart of FIG. 21.

The process begins at S1 where the C-SON function decides to update NCRs for a given scope of cell(s) (e.g. 5G NR cells).

At S2, the C-SON function collects the LULC images for the geographical region specific to the list of cells considered for ANR update. For example, the LULC images may be obtained from a datastore.

At S3, the C-SON function collects the MDT measurement reports for the list of cells considered for ANR update. For example, C-SON retrieves the measurement reports from a datastore.

At S4, the C-SON function derives horizontal and vertical view images based on the MDT measurement reports. In some examples, C-SON derives one horizontal and two vertical view images.

At S5, C-SON function collects images from cameras attached to antennas of the list of cells considered for ANR update.

At S6, C-SON function requests the MDA to perform image analytics and provide the Inference Images for the selected scope of cell(s). In examples, "Inference images" are the inferences derived by applying image analytics at MDAS. In some examples, the term "inference images" may be considered a term that covers both the predicted and measured projection images.

At S7, MDA derives new LULC images. MDA provides C-SON with the updated LULC images if the LULC images provided in S2 are determined to be outdated.

At S8, C-SON updates the radio planning datastore with updated LULC images.

At S9, C-SON function derives the NCRs of the selected scope of cells using the predicted and measured projection images.

According to some examples, S1 to S5 and S9 are mandatory, and S7 and S8 are optional.

Reference is made to the Observe, Orient, Decide and Act (OODA) control loop (see FIG. C-1 in ETSI GS ZSM002).

In terms of the present disclosure, in the "observe" step parameters are collected for the scope of cells selected by the operator. According to some examples, these parameters include: location coordinates (latitude, longitude, azimuth); LULC images in horizontal view and vertical front views; MDT information including RSRP, RSRQ for different UE locations measured for serving cell and up to 3 neighbouring cells; images from cameras attached to antennas of all the selected cells; beam properties for all antennas.

In the "orient" step, Analytics MnS producer (e.g. MDAS) performs the following: converts MDT information into colour-coded images with same colour coding where e.g. RED indicates higher RSRP and RSRQ, and e.g. where GREEN indicates lower RSRP and RSRQ (of course, other colours/identifiers may be used); uses the beam properties to arrive at predicted projection of the transmission pattern; uses the LULC and images from antennas and MDT measurements to arrive at measured projection of the transmission pattern.

In the "decide" step, any changes in the NCR are identified for the selected scope of cells.

In the "act" step, the updated neighbour relationships from the decide step are applied. For example the new neighbour relationships are configured in the network.

Figure 22:
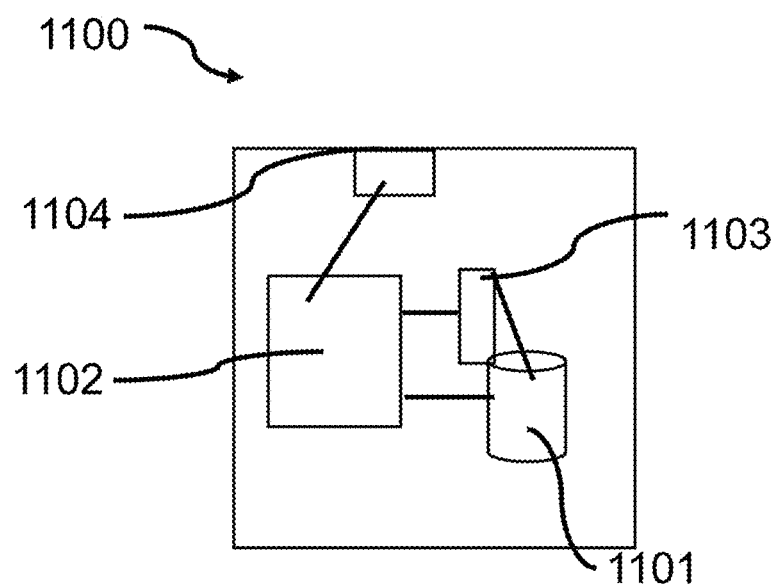
FIG. 22 shows an example of a control apparatus.

FIG. 22 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. For example, such a control apparatus may be suitable for hosting C-SON and/or MDAS/MDAF functionality. The control apparatus 300 can be arranged to provide control on communications in the service area of the system. The control apparatus 1100 comprises at least one memory 1101, at least one data processing unit 1102, 1103 and an input/output interface 1104. Via the interface the control apparatus can be coupled to a receiver and a transmitter of the base station. The receiver and/or the transmitter may be implemented as a radio front end or a remote radio head. For example the control apparatus 1100 or processor 1101 can be configured to execute an appropriate software code to provide the control functions.

Figure 23:
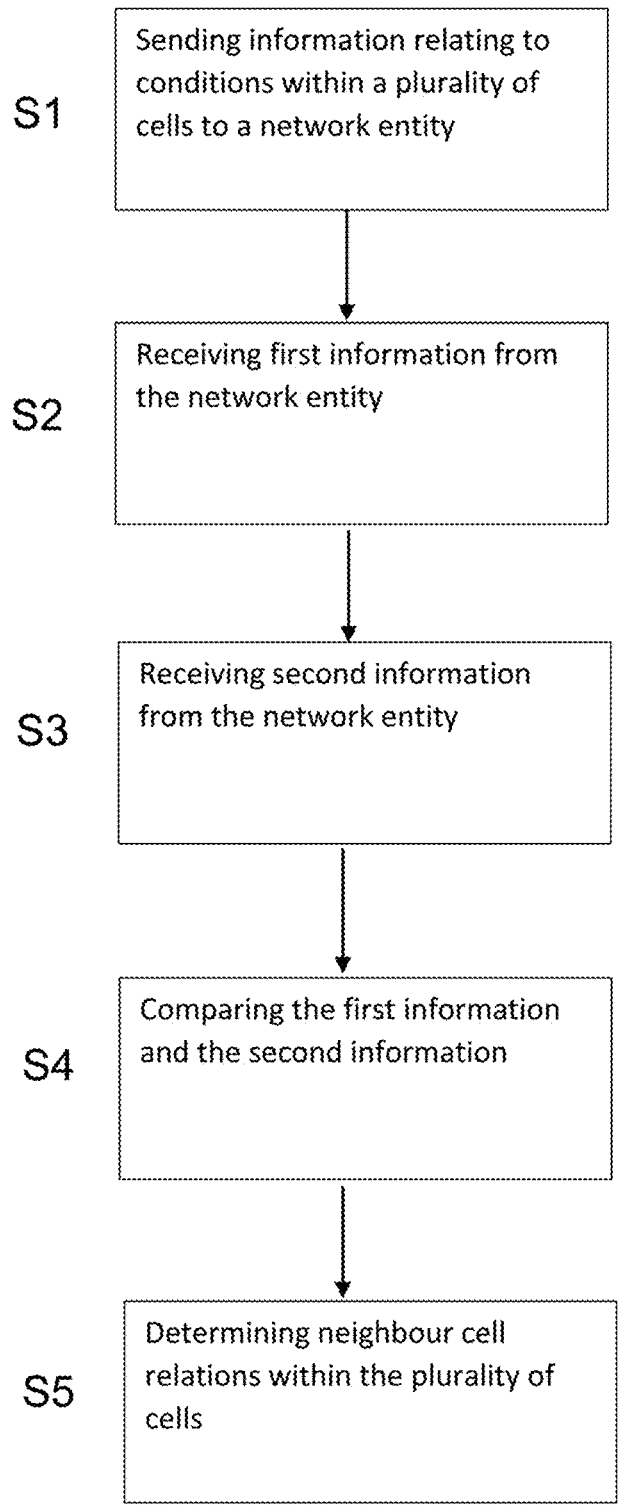
FIG. 23 is a flow-chart of a method according to an example.

FIG. 23 is a flow chart of a method according to an example. FIG. 23 is viewed from the perspective of an apparatus. For example, the apparatus may comprise C-SON functionality.

At S1, the method comprises sending information relating to conditions within a plurality of cells to a network entity. The information relating to conditions within the plurality of cells comprises at least camera image information.

At S2, and in response to the sending information, the method comprises receiving first information from the network entity. The first information comprises information of measured radio conditions within the plurality of cells.

At S3, the method comprises receiving second information from the network entity. The second information comprises information of predicted radio conditions within the plurality of cells.

At S4, the method comprises comparing the first information and the second information. The comparing is to determine areas of correspondence between the first information and the second information.

At S5, the method comprises, based at least in part on the comparing, determining neighbour cell relations within the plurality of cells.

Figure 24:
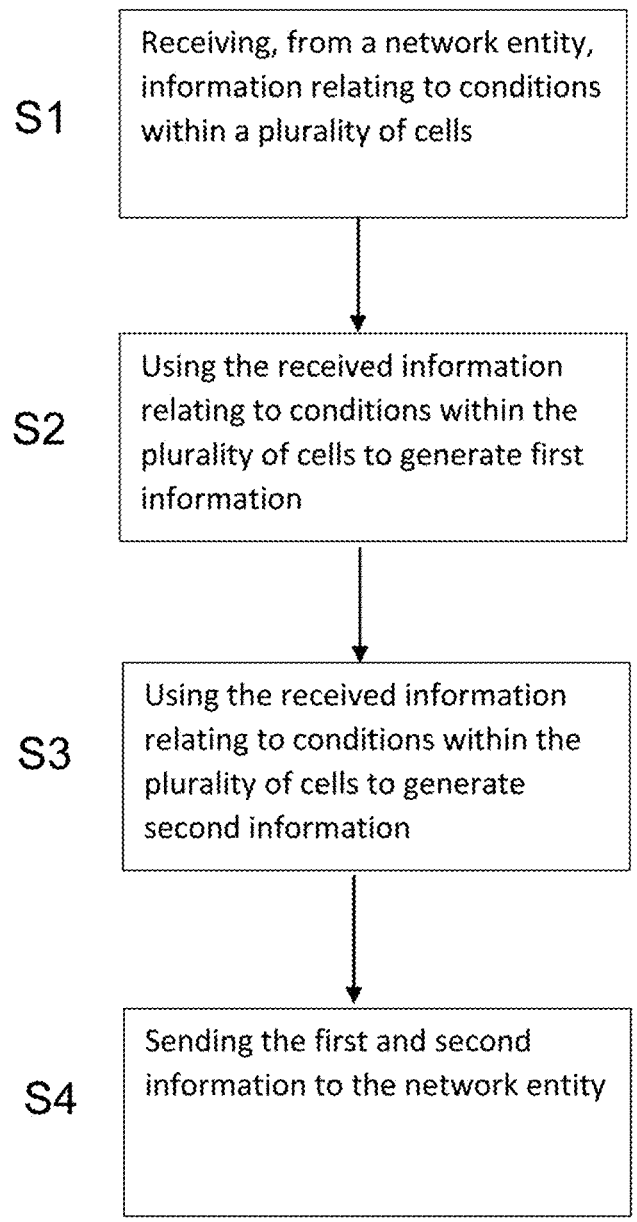
FIG. 24 is a flow-chart of a method according to an example.

FIG. 24 is a flow chart of a method according to an example. FIG. 24 is viewed from the perspective of an apparatus. For example, the apparatus may comprise MDAS and/or MDAF functionality.

At S1, the method comprises receiving, from a network entity, information relating to conditions within a plurality of cells. The information relating to conditions within the plurality of cells comprises at least a camera image.

At S2, the method comprises using the received information relating to conditions within the plurality of cells to generate first information. The first information comprises information of measured radio conditions within the plurality of cells.

At S3, the method comprises using the received information relating to conditions within the plurality of cells to generate second information. The second information comprises information of predicted radio conditions within the plurality of cells.

At S4, the method comprises sending the first and second information to the network entity.

Figure 25:
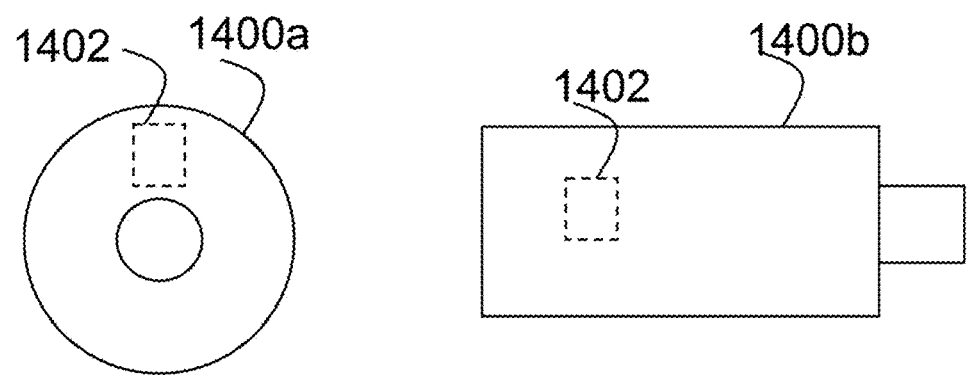
FIG. 25 shows a schematic representation of a non-volatile memory medium storing instructions which when executed by a processor allow a processor to perform one or more of the steps of the methods of some embodiments.

FIG. 25 shows a schematic representation of non-volatile memory media 1400a (e.g. computer disc (CD) or digital versatile disc (DVD)) and 1400b (e.g. universal serial bus (USB) memory stick) storing instructions and/or parameters 1202 which when executed by a processor allow the processor to perform one or more of the steps of the methods of FIGS. 23 to 24. In general, the various embodiments may be implemented in hardware or special purpose circuits, software, logic or any combination thereof. Some aspects of the disclosure may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 10 and/or FIG. 11, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

We claim:

1. An apparatus for an analytics producer, the apparatus comprising:
 at least one processor; and
 at least one memory comprising computer code that, when executed by the at least one processor, causes the analytics producer to:
 receive, from a management service, location data associated with each of a plurality of transmitters;
 receive beam and/or antenna parameters associated with beams provided by the plurality of transmitters;
 use the received location data and received parameters to generate image data representing transmission ranges of the plurality of transmitters; and
 provide the generated image data to the management service.

2. An apparatus as claimed in claim 1, wherein the analytics producer is further caused to:
 receive the beam and/or antenna parameters from the management service,
 wherein the beam parameters comprise at least one of: beam width; beam power; beam direction; antenna type; and antenna azimuth.

3. An apparatus as claimed in claim 1, wherein the antenna parameters comprise image data representing at least one transmission pattern provided by at least one transmitter of the plurality of transmitters.

4. An apparatus as claimed in claim 1, wherein the analytics producer is further caused to:
receive, from the management service, an indication that the apparatus should apply a Gaussian function when generating the image data,
wherein the Gaussian function is a three dimensional Gaussian function.

5. An apparatus as claimed in claim 1, wherein the analytics producer is further caused to:
generate the image data by, for each of the plurality of transmitters, applying a respective Gaussian function to image data representing the location of said each of the plurality of transmitters,
wherein the Gaussian function respectively applied to a particular transmitter's location-based image data is generated utilising a beam power of the particular transmitter as a peak amplitude, a beam width of the particular transmitter as a standard deviation, and a beam direction as a direction for applying the respective Gaussian function.

6. An apparatus as claimed in claim 1, wherein the analytics producer is further caused to:
generate the image data by, for each of the plurality of transmitters, applying a respective antenna transmission pattern to image data representing the location of said each of the plurality of transmitters.

7. An apparatus for a management service, the apparatus comprising:
at least one processor; and
at least one memory comprising computer code that, when executed by the at least one processor, causes the management service to:
send, to an analytics producer, location data associated with each of a plurality of transmitters;
receive, from the analytics producer, image data representing transmission ranges of the plurality of transmitters;
use image analytics techniques on the received image data to determine neighbouring transmitters of the plurality of transmitters; and
use the determined neighbouring transmitters for configuring radio network transmissions.

8. An apparatus as claimed in claim 7, wherein the management service is further caused to:
obtain beam and/or antenna parameters associated with beams provided by the plurality of transmitters;
send, to the analytics producer, the obtained beam and/or antenna parameters,
wherein the beam parameters comprise at least one of: beam width; beam power; beam direction; antenna type; and antenna azimuth.

9. An apparatus as claimed in claim 8, wherein the management service is further caused to:
send, to a radio planning entity, a request for the beam and/or antenna parameters.

10. An apparatus as claimed in claim 8, wherein the antenna parameters comprise image data representing at least one transmission pattern provided by at least one transmitter of the plurality of transmitters.

11. An apparatus as claimed in claim 7, wherein the management service is further caused to:
send, to the analytics producer, an indication that the analytics producer should apply a Gaussian mask when generating the image data.

12. An apparatus as claimed in claim 7, wherein said use of image analytics techniques on the received image data to determine neighbouring transmitters of the plurality of transmitters comprises determining areas of overlap of transmission areas of said plurality of transmitters utilizing at least one colour of the image data.

13. An apparatus as claimed in claim 7, wherein said received image data corresponds to multiple planes of view,
wherein the management service is further caused to:
determine that transmitters of the plurality of transmitters are neighbouring transmitters when their respective transmission regions overlap in at least two planes of view.

14. An apparatus, comprising:
at least one processor; and
at least one memory comprising computer code that, when executed by the at least one processor, causes the apparatus to:
send information relating to conditions within a plurality of cells to a network entity, the information relating to conditions within the plurality of cells comprising at least camera image information; and
in response to the sending information,
receive first information from the network entity, the first information comprising information of measured radio conditions within the plurality of cells;
receive second information from the network entity; the second information comprising information of predicted radio conditions within the plurality of cells;
compare the first information and the second information to determine areas of correspondence between the first information and the second information; and
based at least in part on the comparing, determine neighbour cell relations within the plurality of cells.

15. An apparatus as claimed in claim 14, wherein the apparatus is further caused to:
obtain a minimization of drive test image of the plurality of cells, and the sending information relating to conditions within the plurality of cells to the network entity comprises sending the minimization of drive test image to the network entity,
wherein the minimization of drive test image is in a vertical geographical plane.

16. An apparatus as claimed in claim 14, wherein the apparatus is further caused to:
obtain a land-use land-cover image of the plurality of cells, and the sending information relating to conditions within the plurality of cells to the network entity comprises sending the land-use land-cover image to the network entity,
wherein the land-use land-cover image is in a horizontal geographical plane.

17. An apparatus as claimed in claim 14, wherein the apparatus is further caused to:
obtain information of one or more antenna beam patterns within the plurality of cells, and the sending information relating to conditions within the plurality of cells to the network entity comprises sending the one or more antenna beam patterns to the network entity.

18. An apparatus as claimed in claim 14, wherein the camera image information comprises object recognition information.

19. An apparatus as claimed in claim 14, wherein the apparatus is further caused to:

when comparing the first information and the second information, give a higher weighting to the first information.

20. An apparatus as claimed in claim 14, wherein the first information is in the form of a first image that has been generated by the network entity and the second information is in the form of a second image that has been prepared by the network entity, and the comparing comprises comparing one or more tiles in the first image with one or more tiles in the second image.

* * * * *